United States Patent
Johnsen et al.

(10) Patent No.: US 12,519,722 B2
(45) Date of Patent: Jan. 6, 2026

(54) LOCATION BASED MEDIUM ACCESS CONTROL ADDRESS

(71) Applicant: Graphcore Limited, Bristol (GB)

(72) Inventors: Bjorn Dag Johnsen, Oslo (NO); Brian Edward Manula, Bekkestua (NO)

(73) Assignee: GRAPHCORE LIMITED, Bristol (GB)

(*) Notice: Subject to any disclaimer, the term of this patent is extended or adjusted under 35 U.S.C. 154(b) by 456 days.

(21) Appl. No.: 17/931,614

(22) Filed: Sep. 13, 2022

(65) Prior Publication Data

US 2023/0121096 A1    Apr. 20, 2023

(30) Foreign Application Priority Data

Oct. 14, 2021 (GB) .................................. 2114690

(51) Int. Cl.
  *H04L 45/00* (2022.01)
  *H04L 45/74* (2022.01)
  *H04L 61/103* (2022.01)

(52) U.S. Cl.
  CPC ......... *H04L 45/66* (2013.01); *H04L 45/742* (2013.01); *H04L 61/103* (2013.01)

(58) Field of Classification Search
  CPC ..... H04L 45/66; H04L 45/742; H04L 61/103; H04L 61/58; H04L 61/5038; H04L 2101/622; H04L 2101/69
  See application file for complete search history.

(56) References Cited

U.S. PATENT DOCUMENTS

| | | | |
|---|---|---|---|
| 8,929,377 B2 | 1/2015 | Yang | |
| 2013/0177020 A1* | 7/2013 | Miyazaki | H04L 45/74 370/392 |
| 2013/0230048 A1* | 9/2013 | Liu | H04L 61/103 370/392 |
| 2015/0304208 A1 | 10/2015 | Van Bemmel | |

(Continued)

OTHER PUBLICATIONS

Search Report dated Jun. 8, 2022 for United Kingdom Patent Application No. GB2114690.7.

(Continued)

*Primary Examiner* — Charles C Jiang
*Assistant Examiner* — Shawn D Miller
(74) *Attorney, Agent, or Firm* — HAYNES AND BOONE, LLP

(57) ABSTRACT

A data processing system having an address resolution function for deriving MAC addresses. The set of MACs defined for the devices on the network encode physical position or logical identifier information of those devices. Therefore, each of these MACs is derivable using a mapping function that maps the physical position or logical identifier information supplied by an application to the MAC addresses of the devices on the network. When the protocol processing entity has to send data over the network, it can obtain the MAC address for the destination determined on the basis of the physical position or logical identifier supplied by the application. In this way, since the MACs are derivable on the basis of the physical positions or logical identifiers, the broadcasting of ARP request messages, which would otherwise be required when the protocol processing entity requires the MAC for the destination, may be avoided.

20 Claims, 24 Drawing Sheets

(56) References Cited

U.S. PATENT DOCUMENTS

2016/0381155 A1* 12/2016 Pan ..................... H04L 61/5014
709/221
2019/0149465 A1* 5/2019 Schneider ............... H04L 45/64
370/351

OTHER PUBLICATIONS

David C. Plummer; Network Working Group, An Ethernet Address Resolution Protocol- or -Converting Network Protocol Addresses to 48.BIT Ethernet Address for Transmission on Ethernet Hardware, Nov. 1982.

* cited by examiner

| b8 | b4 | IP8 | IP4 | LL16 | LL12 | LL8 | LL4 | MM8 | MM4 | PO8 | PO4 |
|----|----|-----|-----|------|------|-----|-----|-----|-----|-----|-----|
| b7 | b3 | IP7 | IP3 | LL15 | LL11 | LL7 | LL3 | MM7 | MM3 | PO7 | PO3 |
| b6 | b2 | IP6 | IP2 | LL14 | LL10 | LL6 | LL2 | MM6 | MM2 | PO6 | PO2 |
| b5 | b1 | IP5 | IP1 | LL13 | LL9  | LL5 | LL1 | MM5 | MM1 | PO5 | PO1 |

910     911     912     913     914

900

| b8 | b4 | TT16 | TT12 | TT8 | TT4 | LL24 | LL20 | LL16 | LL12 | LL8 | LL4 |
|----|----|------|------|-----|-----|------|------|------|------|-----|-----|
| b7 | b3 | TT15 | TT11 | TT7 | TT3 | LL23 | LL19 | LL15 | LL11 | LL7 | LL3 |
| b6 | b2 | TT14 | TT10 | TT6 | TT2 | LL22 | LL18 | LL14 | LL10 | LL6 | LL2 |
| b5 | b1 | TT13 | TT9  | TT5 | TT1 | LL21 | LL17 | LL13 | LL9  | LL5 | LL1 |

910　　　　　　　961　　　　　　　　　　　962

950

LOCATION BASED MEDIUM ACCESS CONTROL ADDRESS

CROSS-REFERENCE TO RELATED APPLICATIONS

The present application claims priority to United Kingdom Patent Application No. GB2114690.7, filed Oct. 14, 2021, the disclosure of which is hereby incorporated herein by reference in its entirety.

TECHNICAL FIELD

The present application relates to a data processing apparatus and in particular to a data processing apparatus configured to support the transmission of frames over the network.

INTRODUCTION

In the context of processing data for complex or high volume applications, a processing unit for performing the processing of that data may be provided. The processing unit may function as a work accelerator to which the processing of certain data is offloaded from a host system. Such a processing unit may have specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a processing unit specialised for machine intelligence applications may comprise a large degree of multi-threading. One form of parallelism can be achieved by means of an arrangement of multiple tiles on the same chip (i.e. same die), each tile comprising its own separate respective execution unit and memory (including program memory and data memory). Thus, separate portions of program code can be run in parallel on different ones of the tiles.

In order to increase processing capacity, a plurality of processing units may be connected together to provide a scaled system. In some cases, such processing units may be connected together remotely over a packet switched network, e.g. over an Ethernet network. To provide for communications over such a network, network interface devices associated with the processing units may be provided.

When exchanging data frames over a network, each of the network interface devices communicating over the network is assigned a media access control address (MAC address) that uniquely identifies it on the network. The MAC address is used by nodes in the network (e.g. switches and routers), which route the data frames to a destination identified by a destination MAC address in the header of the frame.

In order for different devices accessible on the network to communicate, an entity having a frame to send will first need to determine the MAC address of the destination to which that frame is to be sent. One way of identifying the MAC address is via use of the Address Resolution Protocol (ARP). ARP identifies the MAC address of the destination on the basis of the IP address of the destination by broadcasting an ARP request message containing that IP address onto the network and, receiving in response, the MAC address of the entity having that IP address.

SUMMARY

One issue with the known technique of broadcasting ARP request messages is that the large amount of messages broadcast onto the network may become a significant overhead. Firstly, the large number of ARP requests broadcast across the network fills up the switching infrastructure connecting the different devices accessible on the network. Furthermore, processing resources of the devices themselves are consumed, with the devices needing to process a significant number of ARP request messages that are irrelevant for that device (i.e. for which the IP address indicated in the ARP request does not match the IP address of that device).

Therefore, there is a need for a technique that may partly or fully replace the high overhead broadcasting of ARP request messages over the network.

According to a first aspect, there is provided a data processing apparatus configured to support transmission of frames over a network, wherein the data processing apparatus comprises processing circuitry configured to support: an address resolution function configured to implement a mapping function for mapping physical position identifiers or logical identifiers of data processing devices accessible on the network to media access control addresses of network interface devices for those data processing devices; an application configured to provide to the address resolution function, a first of the physical position identifiers or logical identifiers corresponding to a destination data processing device to which a first of the frames is to be provided over the network; and a protocol processing entity configured to, in response to receipt of data for the first of the frames for dispatch over the network to the destination data processing device: provide at least part of a link layer header for the first of the frames, the at least part of the link layer header comprising a destination media access control address determined by the address resolution function applying the mapping function to the first of the physical position identifiers or logical identifiers.

The set of MACs defined for the devices on the network encode physical position or logical identifier information of those devices. Therefore, each of these MACs is derivable using a mapping function that maps the physical position or logical identifier information supplied by an application to the MAC addresses of the devices on the network. When the protocol processing entity has to send data over the network, it can obtain the MAC address for the destination determined on the basis of the physical position identifier or logical identifier supplied by the application. In this way, since the MACs are derivable on the basis of the physical positions or logical identifiers, the broadcasting of ARP request messages, which would otherwise be required when the protocol processing entity requires the MAC for the destination, may be avoided.

In some embodiments, the address resolution function is configured to determine the destination media access control address by also applying the mapping function to an identifier of a first network interface device that distinguishes the first network interface device from other network interface devices belonging to the destination data processing device.

In some embodiment, the protocol processing entity is a network protocol stack configured to perform protocol processing for the data at layers higher than the link layer.

In some embodiments, the application is configured to provide the data to the protocol processing entity.

In some embodiments, the application is configured to provide to the protocol processing entity, the first of the physical position identifiers or logical identifiers, wherein the protocol processing entity is configured to request the destination media access control address from the address resolution function on the basis of the first of the physical position identifiers or logical identifiers.

In some embodiments, the address resolution function is configured to, following the determining of the destination media access control address, cache the destination media access control address for subsequent look up for sending a second of the frames to the destination data processing device.

In some embodiments, the processing circuitry is configured to: following the provision of the at least part of a link layer header for the first of the frames, write at least part of the first of the frames to a network interface device for transmission over the network, wherein the at least part of the first of the frames comprises the at least part of the link layer header and a payload of the frame.

In some embodiments, the data processing apparatus comprises a network interface device comprising part of the processing circuitry, wherein the part of the processing circuitry is configured to support the protocol processing entity.

In some embodiments, the processing circuitry comprises a second part of the processing circuitry configured to: support the address resolution function and the application; and provide the destination media access control address to the network interface device for storage as connection state associated with a connection according to which the first of the frames is sent.

In some embodiments, the apparatus comprises at least one processing unit comprising one or more processors configured to execute application instructions to write the data to the network interface device.

In some embodiments, the data processing apparatus comprises a host device comprising the processing circuitry, wherein the processing circuitry is configured to, following the provision of the at least part of the link layer header for the first of the frames, write at least part of the first of the frames to a transmitting data processing device for transmission over the network via a network interface device of the transmitting data processing device, wherein the at least part of the first of the frames comprises the at least part of the link layer header and a payload of the first of the frames.

In some embodiments, the first of the physical position identifiers or logical identifiers comprises an internet protocol address.

In some embodiments, the processing circuitry is configured to, derive the internet protocol address from a first logical identifier of the destination data processing device provided by the application.

In some embodiments, the application is configured to provide to the address resolution function, the physical position identifiers or logical identifiers of the data processing devices, wherein the address resolution function is configured to populate a table with the media access control addresses in a storage that is accessible to the protocol processing entity.

In some embodiment, the table is an address resolution protocol table.

In some embodiments, one or more bits of the destination media access control address indicate a number of times a reset event has occurred.

In some embodiments, the data processing apparatus comprises a register configured to store the one or more bits for inclusion in each of the media access control addresses, wherein the processing circuitry is configured to update the one or more bits in response to an indication of a first reset event.

In some embodiments, the first of the physical position identifiers or logical identifiers is a first physical position identifier, wherein the first physical position identifier comprises one or more of: a rack number, and a machine number.

In some embodiments, the processing circuitry comprises at least one processor configured to execute computer readable instructions to provide at least the application.

According to a second aspect, there is provided a method for supporting the transmission of frames over a network, wherein the method comprises: an address resolution function implementing a mapping function for mapping physical position identifiers or logical identifiers of data processing devices accessible on the network to media access control addresses of network interface devices for those data processing devices; providing to the address resolution function, a first of the physical position identifiers or logical identifiers corresponding to a destination data processing device to which a first of the frames is to be provided over the network; and in response to receipt of data for the first of the frames for dispatch over the network to the destination data processing device: providing at least part of a link layer header for the first of the frames, the at least part of the link layer header comprising a destination media access control address determined by the address resolution function applying the mapping function to the first of the physical position identifiers or logical identifiers.

In some embodiments, the method comprises determining the destination media access control address by also applying the mapping function to an identifier of a first network interface device that distinguishes the first network interface device from other network interface devices belonging to the destination data processing device.

In some embodiment, the step of providing the at least part of a link layer header protocol is performed by a network protocol stack configured to perform protocol processing for the data at layers higher than the link layer.

In some embodiments, the step of providing the first of the physical position identifiers or logical identifiers to the address resolution function is performed by an application, wherein the method comprises the application providing the data to the protocol processing entity.

In some embodiments, the method comprises the application providing to the protocol processing entity, the first of the physical position identifiers or logical identifiers; and the protocol processing entity requesting the destination media access control address from the address resolution function on the basis of the first of the physical position identifiers or logical identifiers.

In some embodiments, the method comprises: following the determining of the destination media access control address, caching the destination media access control address for subsequent look up for sending a second of the frames to the destination data processing device.

In some embodiments, the method comprises following the provision of the at least part of a link layer header for the first of the frames, writing at least part of the first of the frames to a network interface device for transmission over the network, wherein the at least part of the first of the frames comprises the at least part of the link layer header and a payload of the frame.

In some embodiments, the protocol processing entity is supported by processing circuitry of a network interface device.

In some embodiments, the method comprises providing the destination media access control address to the network interface device for storage as connection state associated with a connection according to which the first of the frames is sent.

In some embodiments, the method comprises one or more processors of at least one processing unit executing application instructions to write the data to the network interface device.

In some embodiments, the method comprises, following the provision of the at least part of the link layer header for the first of the frames, writing at least part of the first of the frames to a transmitting data processing device for transmission over the network via a network interface device of the transmitting data processing device, wherein the at least part of the first of the frames comprises the at least part of the link layer header and a payload of the first of the frames.

In some embodiments, the first of the physical position identifiers or logical identifiers comprises an internet protocol address.

In some embodiments, the method comprises deriving the internet protocol address from a first logical identifier of the destination data processing device provided by the application.

In some embodiments, the method comprises: providing to the address resolution function, the physical position identifiers or logical identifiers of the data processing devices; and populating a table with the media access control addresses derived by the address resolution function, wherein the table is in a storage that is accessible to a protocol processing entity for constructing the frames.

In some embodiment, the table is an address resolution protocol table.

In some embodiments, one or more bits of the destination media access control address indicate a number of times a reset event has occurred.

In some embodiments, the method comprises storing the one or more bits for inclusion in each of the media access control addresses; and updating the one or more bits in response to an indication of a first reset event.

In some embodiments, the first of the physical position identifiers or logical identifiers is a first physical position identifier, wherein the first physical position identifier comprises one or more of: a rack number, and a machine number.

In some embodiments, the processing circuitry comprises at least one processor configured to execute computer readable instructions to provide at least the application.

According to a third aspect, there is provided a computer program comprising computer readable instructions which, when executed by at least one processor, cause a method according to the second aspect or any embodiment therefor to be carried out.

According to a fourth aspect, there is provided a non-transitory computer readable medium storing computer program according to the third aspect.

BRIEF DESCRIPTION OF DRAWINGS

To aid understanding of the present disclosure and to show how embodiments may be put into effect, reference is made by way of example to the accompanying drawings in which.

DETAILED DESCRIPTION

Embodiments of a first invention relate to the use of MAC addresses that are derivable from physical location identifiers or logical identifiers of data processing devices. Embodiments of a second invention relate to the use of a generation number in MAC addresses, where that generation number is updated in response to reset events. Embodiments of both of the inventions are described with respect to the accompanying drawings. These inventions may be combined and implemented together in the same apparatus or may be implemented independently.

In the following description, reference is made to a 'MAC address' and to a 'MAC'. Unless otherwise stated, these terms are to be understood as being synonymous.

Figure 1:
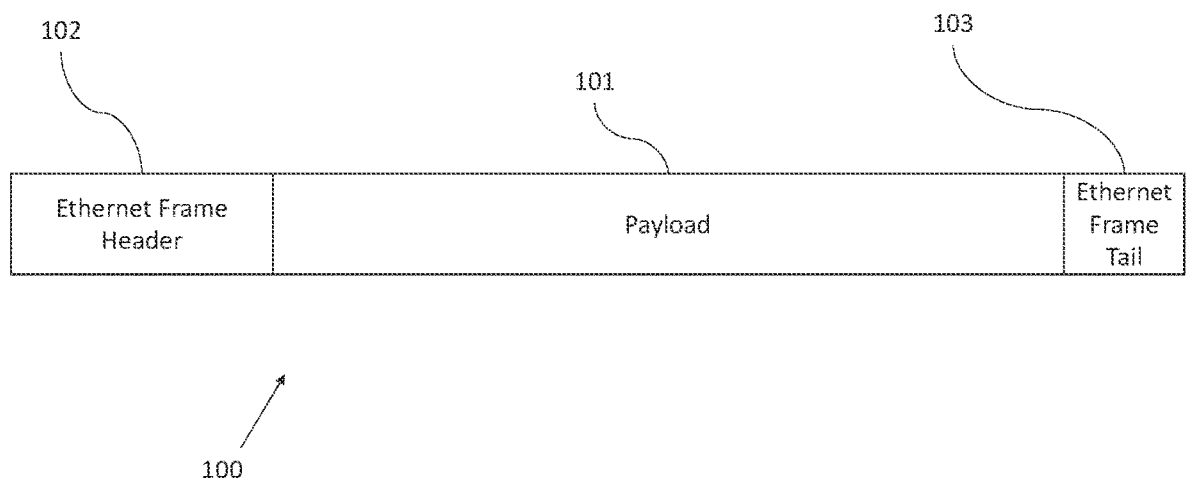
FIG. 1 illustrates the structure of an Ethernet Frame.

Reference is made to FIG. 1, which illustrates an example data frame 100. The example data frame 100 comprises a payload 101, to which is appended a frame header 102 and a frame tail 103. The data frame 100 is a link layer protocol data unit, with the header 102 and tail 103 being formed by link layer processing. In this example, the link layer protocol is Ethernet and the data frame 100 is an Ethernet data frame 100.

Figure 2:
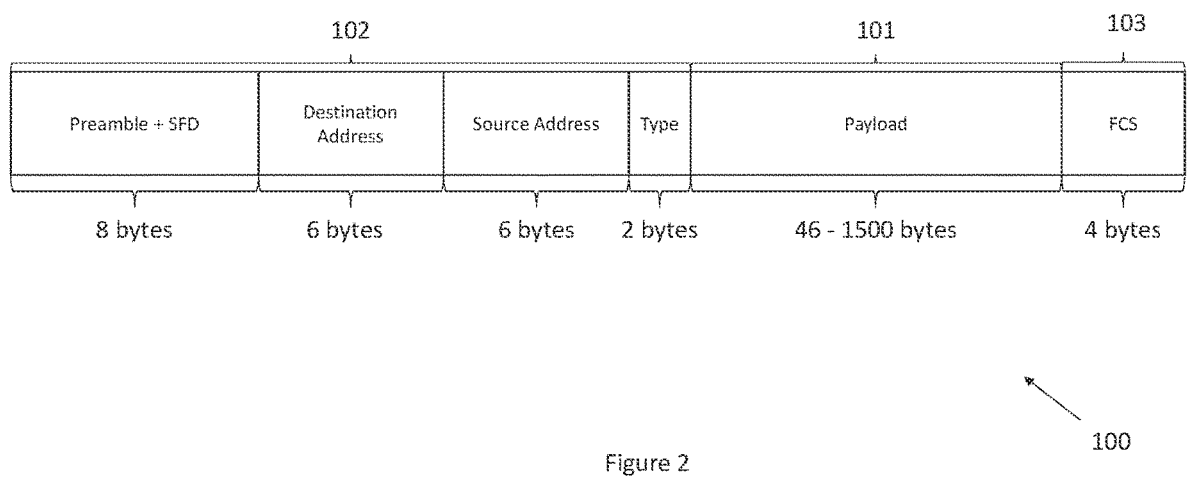
FIG. 2 illustrates the structure of an Ethernet Frame in more detail, with the standard fields of the link layer header and tail shown.

Reference is made to FIG. 2, which illustrates the header 102 and tail 103 of a standard Ethernet frame 100 in more detail.

As shown, the header 102 comprises a preamble and a start frame delimiter (SFD). This part of the frame marks the start of a new incoming frame and enables devices on the network to synchronise their receive clocks. The SFD marks the end of the preamble and indicates the beginning of the destination address.

The destination address indicates the destination network interface device to which the frame 100 is to be delivered over the network. Various switches in the network are configured to examine the destination address field to identify the endpoint to which the data frame 100 is to be delivered. The switches are configured to then route the data frame 100 to that destination. The source address identifies the network interface device on the network from which the data frame 100 originated. In the Ethernet protocol, the destination address and the source address are referred to as medium access control (MAC) addresses.

The header 102 comprises an indication of the type of the data frame 100. This type indication is used to indicate which protocol is encapsulated in the payload 101 of the frame 100. In the Ethernet protocol, this type indication is referred to as an Ethertype.

The tail 103 of the frame 100 comprises a frame check sequence (FCS), which is an error-detecting code that is added to the frame as part of the link layer processing. The FCS is calculated over the header 102 and the payload 101 of the frame 100. The FCS thus provides for error detection for the entire frame. When received at a network endpoint, the FCS is checked, thus providing an indication as to whether or not the frame has been received without error.

The payload 101 of the frame comprises headers of higher layers of the protocol suite in addition to application data. The structure of the payload 101 may take different forms in dependence upon the protocols encapsulated within the frame 100. For example, the data units of different layers in the payload 101 may be nested within a data unit of a lower layer of the protocol suite, with the application data being provided at the highest layer in the protocol suite. Such a nested arrangement is used for frame payloads constructed in accordance with the Internet Protocol suite, in which case the payload 101 comprises application data contained within a transport layer data unit (e.g. a TCP segment or UDP datagram), which has its own header. The transport layer data unit is itself provided as the payload of an Internet layer packet, which also has its own header.

Figure 3A:
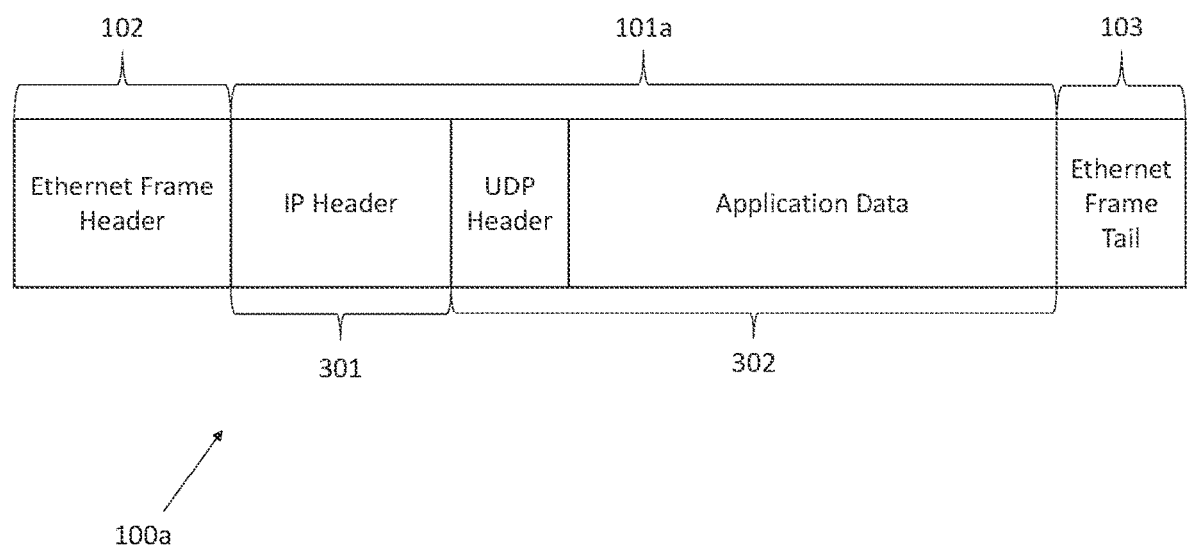
FIG. 3A illustrates the structure of an Ethernet frame in which a UDP datagram is encapsulated.

Reference is made to FIG. 3A, which shows an example data frame 100a formed in accordance with protocols belonging to the Internet Protocol Suite. The data frame 100a is an Ethernet data frame and comprises an Ethernet frame header 102 and Ethernet frame tail 103. Encapsulated within the data frame 100a is an IP (Internet Protocol) packet 101a, which constitutes the payload of the frame 100a. The IP packet 101a has an IP header 301 and an IP payload 302. The IP payload 302 in this example takes the form of a User Datagram Protocol (UDP) datagram 302, which comprises a UDP header and application data.

Embodiment of the application make use of data frames in which the frame payload comprises a number of data packets formed in accordance with a protocol used for network on chip (NoC) communication. These packets comprise headers suitable for routing of the packets to different components of an integrated circuit (i.e. a chip) over an interconnect implemented on that chip. Such packets are referred to herein as ELink packets.

Figure 3B:
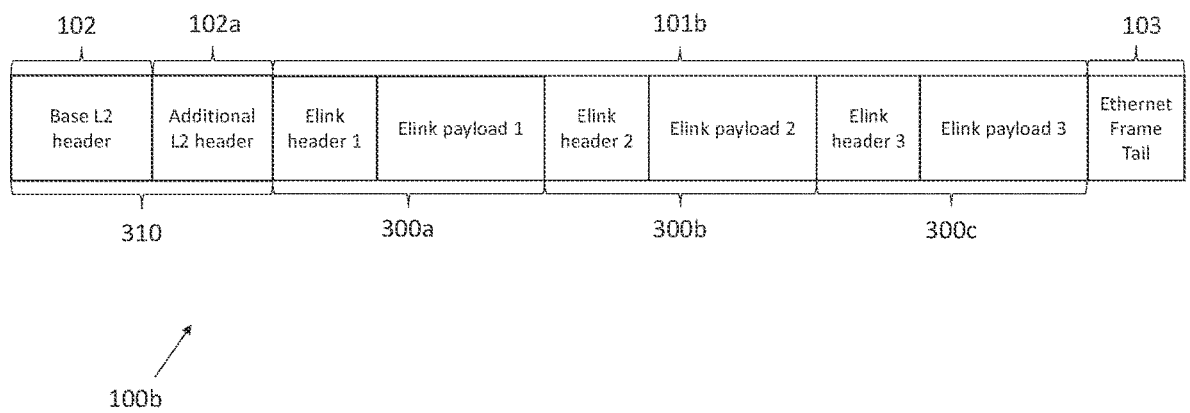
FIG. 3B illustrates the structure of a data frame in which a plurality of ELink data packets are encapsulated.

Reference is made to FIG. 3B, which shows another example data frame 100b. This example data frame 100b comprises a payload 101b comprising packets 300a-c formed in accordance with the ELink protocol used for NoC communication. The data frame 100b is an Ethernet data frame and comprises a standard Ethernet frame header 102 and Ethernet frame tail 103. In addition to the fields of the standard Ethernet frame header 102, the frame 100b also comprises one or more additional link layer header fields 102a. The presence and type of this additional header 102a is indicated by the type field (as shown in FIG. 2) in the base header 102. The one or more additional link layer header fields 102a include a sequence number for the frame 100b. The sequence number enables the sender and receiver to keep track of the frames and is used by the receiver to guarantee that frames are processed in order. The one or more additional header fields 102a may also include a virtual local area network (VLAN) identifier. The additional header 102a also includes a further type indication, which indicates the presence of and defines the type of the ELink headers in the payload 101b.

The payload 101b comprises a plurality of ELink packets 300a, 300b, 300c. Each of the ELink packets 300a, 300b, 300c comprises a header and a payload. The header comprises a plurality of fields, including a destination ID field (DEST_ID), identifying the destination device to which the respective packet is to be routed over the network. Additionally, the header comprises a field (DEST_XSEG) that identifies the component on the destination device to which the respective packet is to be provided upon reaching the destination device, and a field (DEST_ADDRESS) that identifies the location in the memory of the identified component that is targeted by the respective ELink packet. A source ID (SRC_ID) field, identifying the source device from which the packet originated, is also included in the ELink headers. The payload of an ELink packet comprises the data to be delivered to the destination component on the destination device. As shown, a plurality of ELink packets 300a, 300b, 300c are encapsulated together into a data frame for transport over the network to the same destination device.

Figure 4:
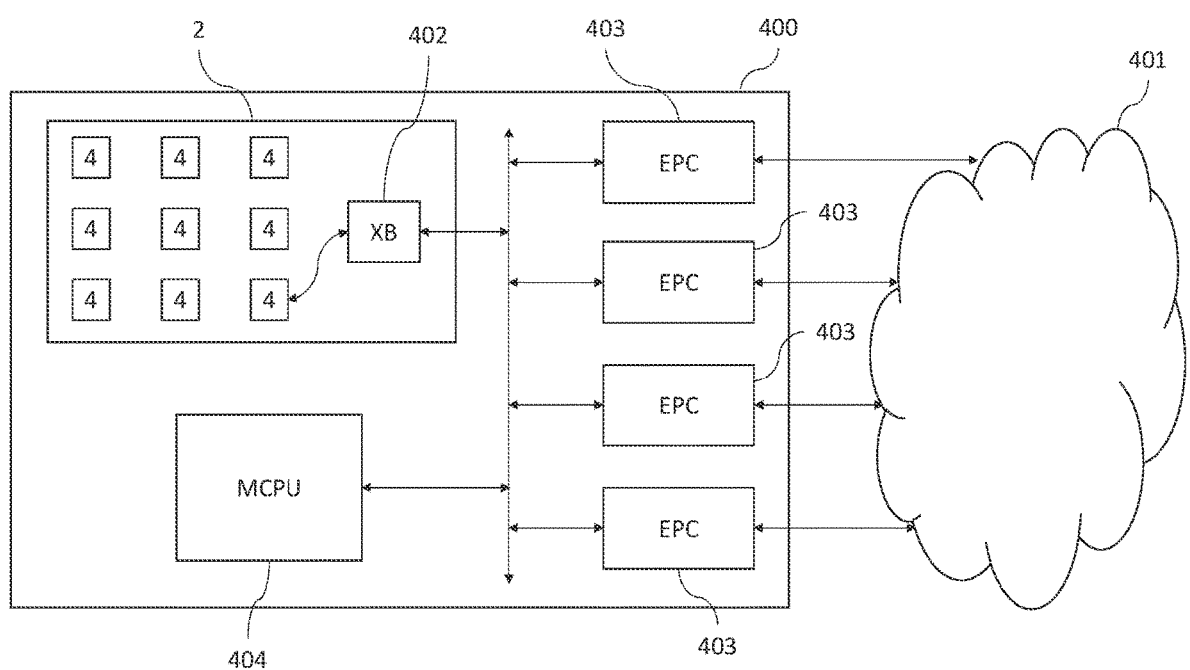
FIG. 4 illustrates a data processing device comprising a plurality of network interface devices for interfacing with a network.

Reference is made to FIG. 4, which illustrates an example of a processing device 400 for sending data over a network 401. In embodiments, the processing device 400 takes the form of a single integrated circuit (i.e. a chip).

The processing device 400 comprises data processing components that are configured to dispatch data packets over the network 401, and are configured to receive data packets from the network 401. One such data processing component is a processing unit 2. The processing unit 2 is a multi-tile processing unit 2 comprising a plurality of tiles 4. Each such tile 4 comprises its own execution unit and memory. An example of the processing unit 2 is described in more detail in our earlier application U.S. Ser. No. 16/276,834, which is incorporated by reference.

One or more of the tiles 4 are configured to send and receive data over the network 401 by exchanging data packets with a hardware module 402 (referred to herein as an exchange block) of the processing unit 2. To send data over the network 401, a tile 4 issues one or more data packets in a first format (referred to as the TLink packet format) to the hardware module 402. Circuitry of the hardware module 402 converts each of those TLink packets to the ELink packet format. The ELink packets are sent from the hardware module 402 over an interconnect of the chip 400 to a network interface device 403 (shown in FIG. 4 as an "EPC" (i.e. Ethernet Port Controller)).

The processing device 400 comprises a plurality of network interface devices 403. Each network interface device 403 is hereafter referred to as a NIC 403. Features described herein as being features of a NIC 403, may be features of any or all of the plurality of NICs 403.

These multiple NICs 403 are provided to support different connections in which the device 400 participates. In some embodiments, each NIC 403 may support up to two different connections at the same time. In some embodiments, there are 24 different NICs 403 on the same device 400. Some of the connections supported by the NICs 403 may be connections between a same pair of processing devices 400. Multiple connections may be established between such devices 400, so as to increase the bandwidth of data transfer between those two devices 400.

When the processing unit 2 has packets to send to a particular destination over the network 401, the processing unit 2 issues ELink packets to the NIC 403 that is set up to send and receive data over a connection with that particular destination. When the NIC 403 receives the ELink packets, it performs link layer protocol processing to encapsulate the ELink packets into one or more data frames and dispatches those data frames over the network 401. In this way, the ELink packets are tunnelled over the Ethernet network 401 in Ethernet frames. These frames form a flow of connection traffic for which the network interface device 403 ensures reliable delivery, by retransmitting data frames if successful transmission is not verified by the destination device. An example Ethernet frame 100b forming part of the connection traffic is shown in FIG. 3B.

The NIC 403 also functions to receive data frames comprising one or more ELink packets from the network 401 for delivery to one or more tiles 4 of the processing unit 2. When a data frame in which one or more ELink packets are encapsulated is received at the NIC 403, the NIC 403 performs the required link layer protocol processing to check the data frame for errors and to extract the ELink packets. The NIC 403 then dispatches these extracted ELink packets to the hardware module 402 of the processing unit 2. The hardware module 402 converts the ELink packets to the TLink packet format and provides them to the appropriate destination tile 4 as indicated in the ELink/TLink packet headers.

The traffic transmitted between tiles 4 of different processing units 2 over the network 401 may be referred to as application traffic, since the payload contents of the ELink packets comprise application data related to the distributed application running on different processing units 2 connected over the network 401. The application data may comprise input data for calculations to be performed by execution units of destination tiles 4 to which the application data is sent and/or may comprise results of processing by source tiles 4 from which the application data is sent.

Another data processing component of the device 400 is a processing component 404, which is referred to herein as the management CPU (MCPU). The MCPU 404 is also able to send and receive data over the network 401 using the NICs 403, but via a different mechanism to that used by the processing unit 2. The MCPU 404 implements a driver functionality for sending and receiving data over the network 401 via the NICs 403 by writing partial data frames to the NICs 403. These frames may be sent and received by the MCPU 404 using any of the NICs 403 on the device 400.

In order to send data over the network 401, the MCPU 404 dispatches one or more ELink data packets over the interconnect of the device 400 to a NIC 403. The one or more ELink data packets comprise writes of data to a buffer of the NIC 403. More specifically, these ELink packets comprise writes of part of a data frame to a buffer of the NIC 403. The part of the data frame written to the buffer by the ELink packets comprises a payload and part of a frame header for the data frame. The part of the frame header written by the MCPU 404 to the NIC 403 buffer includes the destination MAC address, the source MAC address, and the EtherType fields of the frame header. After receiving and storing the payload and these parts of the frame header from the MCPU 404, the NIC 403 generates the FCS for the frame and appends this as the frame tail 103. The NIC 403 also adds the remaining parts of the frame header, i.e. the preamble and SFD. Once the NIC 403 has completed the data frame, it then causes the data frame to be dispatched over the network 401 to be sent to the destination device as identified by the destination MAC address in the frame header.

This mechanism by which the MCPU 404 sends data over the network 401 may be referred to herein as the datagram send mechanism (with the frames being referred to as datagram frames), reflecting that the data frames are provided to the NIC 403 and sent by the NIC 403 without any connection state being maintained by the NIC 403. The transport layer protocol for these frames could be UDP, with the data frames sent by the NIC 403 in accordance with the datagram send mechanism taking the form of the example data frame 100 shown in FIG. 3A. However, the protocol could be a connection based protocol (such as TCP), with the connection state being maintained outside of the NIC 403, for example, in an operating system running on the MCPU 404.

On the receive side, a datagram frame received from over the network 401 and for delivery to the MCPU 404 is stored in the NIC 403. The NIC 403 checks the frame for errors using the FCS of the frame. If the frame passes the check (i.e. no errors are detected for the frame), the NIC 403 signals the MCPU 404. In response, the MCPU 404 issues one or more read requests (in the form of ELink packets)

over the interconnect of the device 400 to the NIC 403 to read the frame from a buffer in the NIC 403. This mechanism may be referred to as the datagram receive mechanism.

The datagrams may be used for a variety of purposes. One example purpose is testing, in which case the datagram frames are test data frames sent to test the connectivity of the network 401. Another purpose is connection management, in which case the datagram frames are exchanged between devices 400 so as to set up a connection between those devices 400, such that the processing units 2 of those devices 400 may exchange traffic over such a connection.

Figure 5:
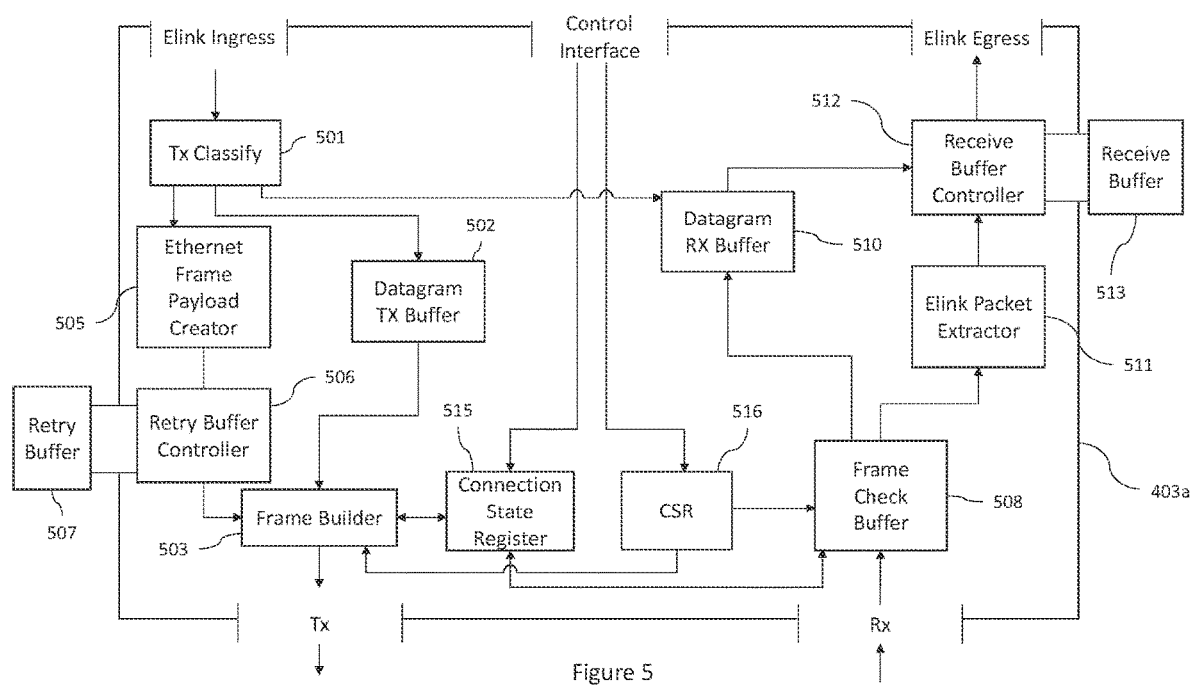
FIG. 5 illustrates the components of an example network interface device.

The operation of an example NIC 403 will be now be described in more detail. Reference is made to FIG. 5, which illustrates an example of a NIC 403a. This NIC is labelled as NIC 403a to identify it specifically from amongst the plurality of NICs 403 in the system. However, it would be appreciated that the other NICs 403 (including both the NICs 403 shown in FIG. 4 and the NICs 403 belonging to other devices 400) include the same features and operate in the same way. Each of the blocks shown in FIG. 5, and described as being for performing processing operations, comprises appropriate circuitry for performing the operations described. Furthermore, the NIC 403a comprises additional circuitry, other than the blocks shown in FIG. 5, for performing any additional operations described below as being performed by the NIC 403a. References below to operations performed by the NIC 403a are to be understood as referring to operations performed by the circuitry of the NIC 403a. The circuitry of the NIC 403a may comprise one or more field programmable gate arrays (FPGA) and/or one or more application specific integrated circuits (ASIC). Additionally or alternatively, the circuitry of the NIC 403a may comprise one or more processors configured to execute computer readable instructions to perform the operations described herein as being performed by the NIC 403a or by circuitry of the NIC 403a. The circuitry of the NIC 403a may also be referred to as processing circuitry.

The NIC 403a comprises an interface (labelled as 'ELink Ingress') for receiving ELink packets from the data processing components (i.e. processing unit 2 and MCPU 404) of the device 400. These ELink packets may be writes from the MCPU 404 to the datagram transmit buffer 502 of the NIC 403a. Alternatively, the packets may be ELink packets received from the processing unit 2 and for being encapsulated and dispatched over the network 401 in a data frame.

The NIC 403a comprises circuitry (represented as Tx Classify 501 in FIG. 5) for classifying the traffic received from over the ELink ingress. Each ELink packet received at the ELink ingress port includes a destination ID field. This destination ID field indicates which component (i.e. a buffer or register) of the NIC 403a is targeted by the ELink packet. The Tx classify 501 component may, when it receives an ELink write packet, in dependence upon the indication in the ELink packet header, provide this write to either the Ethernet Frame Payload Creator 505 or to the datagram Tx buffer 502. The processing unit 2 provides the ELink write packets targeting the Ethernet Frame Payload Creator 505, whilst the MCPU 404 provides the ELink write packets targeting the Datagram Tx buffer 502.

When the Tx classify circuit 501 identifies a series of ELink packets as being writes targeting the datagram transmit buffer 502, circuitry of the NIC 403a causes the payload data in these writes to be written to the datagram TX buffer 502. The headers of these ELink packets are discarded. The payload data from the ELink packets that is written to the buffer 502 may comprise parts of any arbitary data frame. An example data frame 100a that may be partially written to the buffer 502 is shown in FIG. 3A. The parts of the data frame (i.e. the payload 101a and most of the header 102) written to the buffer 502 are provided in the payloads of a plurality of ELink packets provided by the MCPU 404.

Some of the data frames written to the buffer 502 by the MCPU 404 are test data frames for testing the connections in the network 401. Others are for dispatch to a corresponding MCPU 404 on another device, e.g. for connection management purposes. The type of partial data frame for transmission over the network 401 is indicated by the EtherType field in the header of the data frame. For example, the EtherType field may indicate that the data frame is a test data frame. Alternatively, the EtherType field may indicate that the data frame is a data frame for connection management or some other purpose (e.g. an IP packet or ARP request packet).

The NIC 403a comprises frame builder circuitry 503 that is configured to generate the FCSs for the partial data frames held in the buffer 502 and add these as the tails of the partial data frames. Additionally, the frame builder circuitry 503 completes the headers of the partial data frames by adding the preambles and the SFDs. After completing a data frame in this way, the NIC 403a causes the frame to be transmitted over the network 401.

If the Tx classify circuitry 501 identifies received ELink data packets as targeting the Ethernet frame payload creator 505, circuitry of the NIC 403a causes those received ELink data packets to be stored in a buffer associated with the Ethernet Frame Payload Creator circuitry 505. These ELink packets targeting the Ethernet Frame Payload Creator circuitry 505 are for sending over the network 401 as connection traffic. The Ethernet Frame Payload Creator circuit 505 concatenates these received ELink data packets to form a payload for a data frame. This concatenation may comprise padding one or more of the ELink packets, such that the payload of each ELink packet is a multiple of 16 bytes. The resulting Ethernet frame payload is provided to the frame builder 503, which encapsulates the payload into an Ethernet frame by adding the header and the footer. The frame builder 503 then causes the frame to be transmitted over the network 401.

The frame builder 503 obtains the destination MAC for the frame from the connection state register 515, and obtains the source MAC for the frame from the control and status register (CSR) 516. The connection state register 515 and the CSR 516 are written over the control interface by the MCPU 404. The MCPU 404 writes to these registers 515, 516, the MAC addresses for the NICs 403 which participate in an active connection supported by NIC 403a. One of these NICs 403 is the NIC 403a itself. The MCPU 404 provides the NIC 403a with its own MAC address by writing this MAC address to the CSR 516. The other NIC 403 participating in the connection for which the MCPU 404 provides the MAC is the NIC 403 at the other end of the connection. This MAC is stored as part of the connection state (stored in the connection state register 515) for the connection. The MCPU 404 also writes an identifier of the connection to the connection state register 515. The result is that the state associated with a connection in the connection state register 515 comprises the identifier of the connection and the MAC address for the other NIC 403 (which serves as the destination for frames sent by the NIC 403a over the relevant connection and the source for frames received by the NIC 403a over the relevant connection). The identifier of the connection is included with the ELink packets to be sent over the connection and serves to identify the correct connection state when those ELink packets are received at the NIC 403aa.

The frame builder 503, when it obtains the Ethernet frame payload from the Ethernet frame payload creator 505, looks up the destination MAC address required for the Ethernet header from the connection state register 515. The frame builder 503 performs this lookup by using the connection identifier provided with the ELink packets to identify the state for the connection. Once the state is identified, the MAC address stored as part of that state is loaded from the register 515 and inserted into the frame header as the destination MAC address. The frame builder 503 also obtains the MAC address of the sending NIC 403a from the CSR 516. This MAC address is loaded from the register 516 by the frame builder 503 and inserted into the frame header as the source MAC address.

The payload provided by the Ethernet frame payload creator 505 to the frame builder 503 is sent via a retry buffer controller 506, which comprises circuitry for storing that payload in a retry buffer 507. That payload is then available in the retry buffer 507 for retransmission, should such retransmission from the NIC 403a be required. The payloads sent via this mechanism are sent via a connection oriented protocol, which provides for reliable transmission by providing for retransmission using buffer 507 when frame transmission fails.

On the receive side, when a data frame is received from the network 401 at the NIC 403a, that data frame is provided to the frame check buffer 508. Circuitry of the NIC 403a checks that the destination MAC indicated in the header of the frame matches the MAC for the NIC 403a. The MAC for the NIC 403a is obtained from the CSR 516. If the destination MAC in the header of the frame does not match the MAC for the NIC 403a, circuitry of the NIC 403a discards the frame. In response to determining that the destination MAC in the header of the frame matches the MAC for the NIC 403a, circuity of the NIC 403a accepts the frame (the acceptance of the frame may also be subject to further conditions, e.g. the FCS check described below).

In addition the checking the destination MAC, circuitry of the NIC 403a causes the data frame to be checked using the FCS contained in the frame. If the frame does not pass the check, the circuitry discards the frame. If the frame does pass the check, the NIC 403a accepts the frame.

When the NIC 403a accepts the frame, the action taken depends upon the EtherType in the frame. If the EtherType indicates that the frame is a datagram frame, the circuitry of the NIC 403a causes the frame to be written to the datagram receive buffer 510. Circuitry of the NIC 403a then provides a signal over the control interface to the MCPU 404, indicating that a data frame is available in the buffer 510. In response, the MCPU 404 issues ELink read request packets, which are received at the ELink Ingress interface. The Tx classify circuitry 501 identifies these read request packets as targeting the datagram receive buffer 510 and consequently, circuitry of the NIC 403a causes the data frame held in the buffer 510 to be read out of the buffer 510 over the ELink Egress interface and provided to the MCPU 404.

If the EtherType indicates that the frame belongs to the connection traffic, circuitry of the NIC 403a causes an acknowledgment (ACK) that the frame was successfully received to be sent to the source device of the frame. This prevents the source device from retransmitting the frame. Additionally, that frame is provided from the Frame check buffer 508 to the ELink packet extractor circuitry 511, which extracts from the frame, the plurality of ELink packets contained in the payload of the frame. These are provided to the receive buffer controller circuit 512, which has an associated receive buffer 513 for buffering ELink packets prior to dispatch of these packets over the ELink egress interface of the NIC 403a. The receive buffer controller 512 causes the extracted ELink packets provided by the ELink packet extractor 511 to be sent over the interconnect of the device 400 to the processing unit 2 for delivery to one or more of the tiles 4 of that processing unit 2.

The MCPU 404 implements an address resolution function for determining the MAC addresses for including in headers of frames sent over the network 401. The MCPU 404 applies such an address resolution function for determining the MAC addresses for the connection traffic and for determining the MAC addresses used for sending frames comprising the datagrams constructed by the MCPU 404 itself.

With regard to the connection traffic, as has already been described, the MCPU 404 provides the MAC addresses for the NICs 403 that exchange data with one another over a connection, by writing these MAC addresses to registers (e.g. the connection state register 515 and the CSR 516) in the NIC 403a. The MCPU 404 makes use of the address resolution function in order to determine the MAC addresses for these NICs 403 before writing these determined MAC addresses to the registers in the NIC 403a.

With regard to the datagram traffic, the MCPU 404 implements a network protocol stack for performing the protocol processing to produce the partial frames that are written to the transmit buffer 502 in the NIC 403a. This protocol processing may comprise generating a UDP header and IP header for a frame, such as frame 100a, shown in FIG. 3A. The protocol processing includes at least link layer processing, in which the destination and source MAC addresses are obtained and provided as part of the frame header. In order to provide the network protocol stack in the MCPU 404 with the MAC addresses as required, the address resolution function provided by the MCPU 404 is made use of. The address resolution function provides the MAC addresses required by the network protocol stack, which includes them in the frame headers.

According to embodiments of the first application, the address resolution function implemented by the MCPU 404 may determine the destination MAC address without a requirement to broadcast ARP requests over the network 401. The address resolution function determines the destination MAC address in dependence upon a physical position identifier and/or logical identifier of the destination device comprising the NIC 403 to which the frame is to be dispatched.

The physical position identifier may, for example, specify the rack number of the destination device 400 comprising the destination NIC 403, and the machine number identifying that device 400 in the identified rack. As an example, the physical position identifier may take the form of: [rack 4; machine 3], which identifies the third machine in the fourth rack.

The logical identifier is an identifier used to identify the role of the device within a distributed application that may be independent of the physical position of that device. The logical identifier indicates the operations performed by the particular processing unit 2 in the context of the system. The logical identifiers are used in the application code executed on the processing unit 2 to identify devices to which data is to be dispatched.

Figure 6:
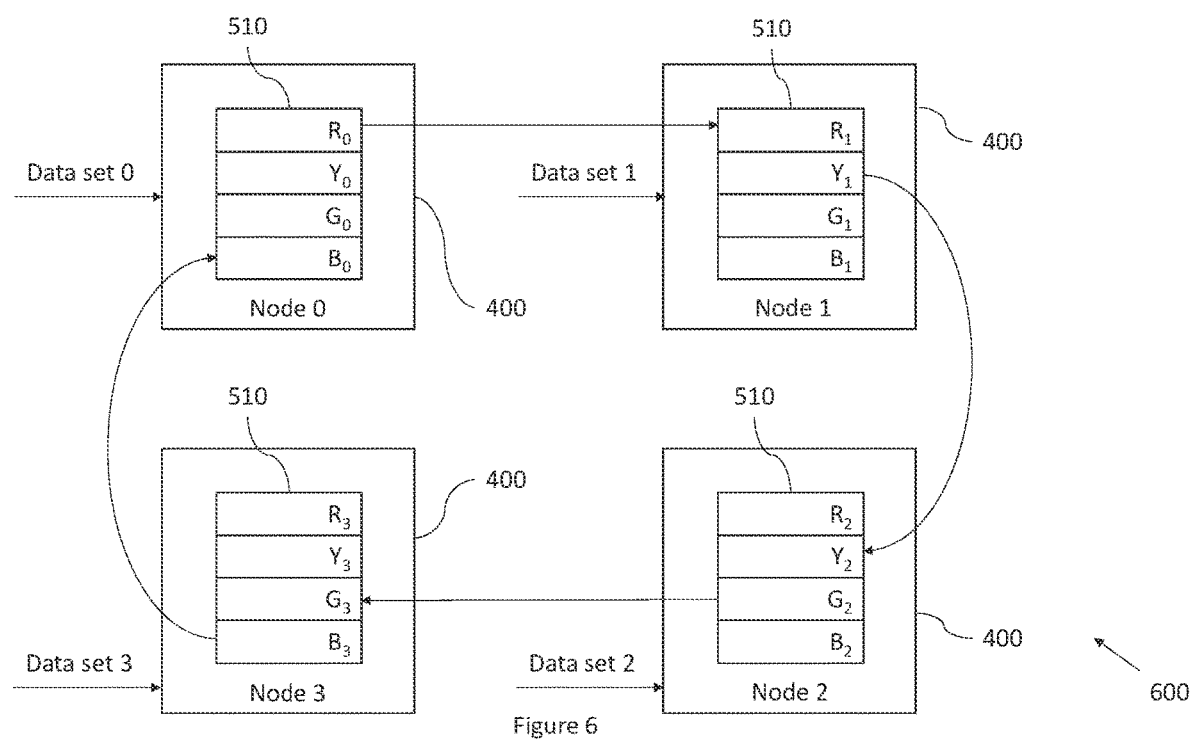
FIG. 6 illustrates an example of a data exchange pattern between different devices within a data processing system.

To give an example of a distributed application implemented on a system comprising a plurality of processing devices 400, reference is made to FIG. 6, which illustrates a system 600 comprising a plurality of devices 400. Each of the devices 400 may also be referred to as a node 400. Each of the nodes 400 is labelled with a number (e.g. node 0), which may be the logical identifier of the node 400, which indicates its role in the distributed application. The application running on the system 600 is used to perform data parallel training of a machine learning model. The processing unit 2 (not shown in FIG. 6) of each node 400 in the system 600 processes a different data set to produce a set of gradients for updating the model parameters. These gradients are labelled as R, Y, G, B in FIG. 6. In order to distribute the results of the data parallel training across the nodes, an all-reduce collective is performed. The all-reduce collective comprises a first stage (reduce-scatter) and a second stage (all-gather). As a first step of the reduce-scatter stage, each of the nodes 400 exchanges a subset of gradients corresponding to a different set of the model parameters with another one of the nodes 400. The exchange of the gradients between the devices 400 takes place over the network 401. For example, node 0 sends the gradients $R_0$ to node 1. Node 1 sends the gradients $Y_1$ to node 2. Node 2 sends the gradients $G_2$ to node 3. Node 3 sends its gradients $B_3$ to node 0. The remaining steps of the all-reduce collective are described in our earlier application, U.S. patent application Ser. No. 16/840,988, which is incorporated by reference.

It would be appreciated from the example of FIG. 6 that each of the devices 400 is required to send a different portion of its gradients to a different destination node 400 at a given stage. The particular subset of data sent by the device 400, and the destination to which that data is sent, depends upon the logical identifier of the device 400. Furthermore, when sending data to a destination device 400, the application code specifies the logical identifier of that device in the instructions executed to send data to that device 400. In some embodiments, the application code sets allocated to the devices 400 having different logical identifiers may be substantially different. In other embodiments, the code sets may comprise the same instructions, but be indexed such that different processing units 2, although operating using the same code, perform different operations at different times.

As described, in example embodiments, each of the devices 400 includes a plurality of NICs 403. Therefore, in this case, the mapping function implemented by the address resolution function also takes account of an identifier of the destination NIC 403 of the destination device 400 that distinguishes that destination NIC 403 from the other NICs 403 of the destination device 400.

In order for the address resolution function running on the MCPU 404 to derive the MAC addresses for communication over the network 401, the MCPU 404 supports application code that is configured to provide the physical position identifiers or logical identifiers to the address resolution function. The address resolution function includes a mapping function for deriving a plurality of bits of each of the MAC addresses from physical position identifiers or logical identifiers provided by the application. In the case that each of the devices 400 includes a plurality of NICs 403, the application also provides the identifiers of the NICs 403 on each of the devices 400 between which communication is to take place. The mapping function then derives the MAC addresses for those identified NICs 403 from both the physical position identifiers or logical identifiers of the devices 400 to which they belong and their NIC 403 identifiers.

Figure 7:
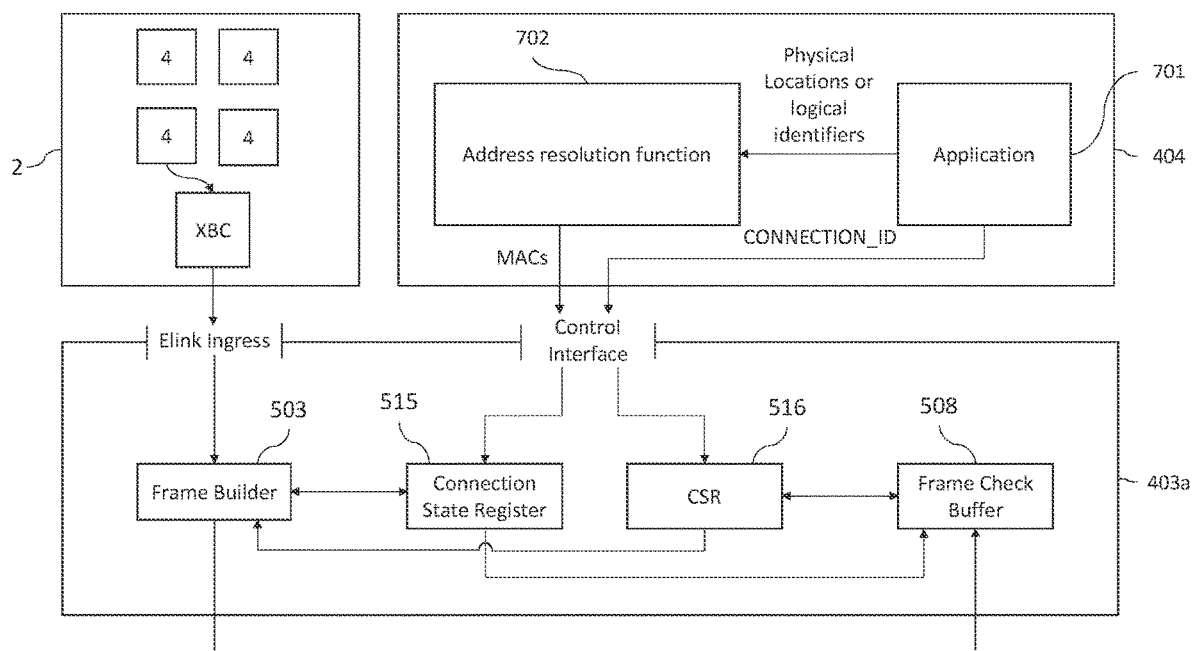
FIG. 7 illustrates the use of an address resolution function for providing the MAC addresses for a connection in dependence upon physical location identifiers or logical identifiers.

Reference is made to FIG. 7, which illustrates an example in which the MCPU 404 provides the NIC 403a with the MAC addresses to be used for a connection. These MAC addresses are the MAC addresses of the NICs 403 (including NIC 403a) at the two endpoints of the connection.

As shown in FIG. 7, at least one processor of the MCPU 404 supports an application 701 and an address resolution function 702. As part of setting up a connection over the network 401, the address resolution function 702 derives the MAC of the NIC 403a. To enable it to do so, the application 701 provides to the address resolution function 702, a physical position indication or logical identifier of the device 400 (which includes both the MPCU 404 and the NIC 403a). The address resolution function 702 applies the mapping function to the physical position indication or logical identifier to derive a plurality of bits of the MAC address. Since the device 400 comprises a plurality of NICs 403, the plurality of bits of the MAC address derived by the mapping function also depend upon an identifier of the NIC 403a that distinguishes it from the other NICs 403 of the device. This identifier of NIC 403a is also provided by the application 701 to the address resolution function 702.

The address resolution function 702 also derives the remaining bits of the MAC address. The remaining bits include a bit indicating that the MAC address is a local scope address. As will be described in more detail, the remaining bits may also include generation number, which is updated in response to reset events.

Having determined the MAC address of the NIC 403a, the MCPU 404 writes this MAC address over a control bus of the device 400 to the NIC 403a. The MAC address is received at the NIC 403a and stored in the CSR 516. As described, the frame builder 503 accesses this CSR 516 to obtain the MAC address and includes it in frame headers of frames dispatched from NIC 403a as the source MAC address. On the receive side, circuitry of the NIC 403a checks the destination MAC in received frames against the MAC address of the NIC 403a held in the CSR 516, and only accepts frames when the destination MAC of the frame matches the MAC in the CSR 516.

Additionally, as part of connection setup, the address resolution function 702 derives the MAC address of the other NIC 403 participating in the connection. This other NIC 403 participating in the connection is the NIC 403 that receives frames sent by NIC 403a over network 401 and sends frames to NIC 403a over the network 401. To derive the MAC address of this other NIC 403, the application 701 provides the physical position identifier or logical identifier of the device 400 comprising the other NIC 403 to the address mapping function 702. The address resolution function 702 applies the mapping function to the physical position indication or logical identifier to derive a plurality of bits of the MAC address. Since each device 400 comprises a plurality of NICs 403, the plurality of bits of the MAC address derived by the mapping function are also derived in dependence upon an identifier of the other NIC 403 participating in the connection that distinguishes it from the other NICs 403 of its device 400. This identifier of the other NIC 403 is also provided by the application 701. The address resolution function 702 also derives the remaining bits of the MAC address. The remaining bits may be the same as the corresponding bits (i.e. those independent of the position, logical identifier or NIC identity) of the source MAC.

Once the address resolution function 702 has determined the MAC of the other NIC 403 participating in the connection, the MCPU 404 writes this MAC over the control bus to the connection state register 515 of the NIC 403a. This MAC is stored as part of the connection state for the connection. In order for the connection state to be correctly identified when ELink packets are received at the NIC 403a, the application 701 of the MCPU 404 writes a connection identifier to the connection state register 515. The connection identifier is part of the connection state (which also includes the MAC of the other NIC 403) and enables look up of the MAC of the other NIC 403 on that device 400. Each of the ELink packets received at the NIC 403a, and for tunnelling over a connection, include the connection identifier, enabling circuitry of the NIC 403a to identify the connection state for the connection and, therefore, look up the MAC of the other NIC 403.

When the frame builder 503 receives the ELink packets for encapsulating into a frame, the frame builder 503 accesses the connection state—which is held in the connection state register 515—that is identified by the connection identifier in the ELink packets. The frame builder 503 retrieves the MAC address stored as part of this connection state and includes it as the destination MAC address in the header of the frame.

When setting up the connections, the topology implied by these connections matches that required by the application code running on the processing unit 2. To achieve this, the application 701 and the application code running on the tiles 4 of the processing unit 2 are generated as a related set at compile time. In this way, the application 701 is compiled to provide the appropriate position/logical identifiers such that the appropriate MACs are loaded into the NICs 403 of the device 400 to support communication between the appropriate devices 400 as required by the application code executing on the tiles 4.

In addition to providing the MAC addresses to the NIC 403a for connection setup, the address resolution function 702 provides the MAC addresses for the construction of frames comprising the datagrams that are produced by the MCPU 404 itself. For this purpose, the at least one processor of the MCPU 404 supports a network protocol stack that is configured to access the MAC addresses provided by the address resolution function 702. The application 701 provides the physical location identifier or the logical identifier to the network protocol stack 703, along with the data for transmission. The network protocol stack 703 obtains the MAC address of the destination that is determined by the address resolution function 702 in dependence upon the provided physical location identifier or logical identifier. In some embodiments, the mapping function is called dynamically when required by the network protocol stack 703. In other embodiments, the mapping function provides a static look up table for access by the network protocol stack 703 when required by the stack 703.

Figure 8A:
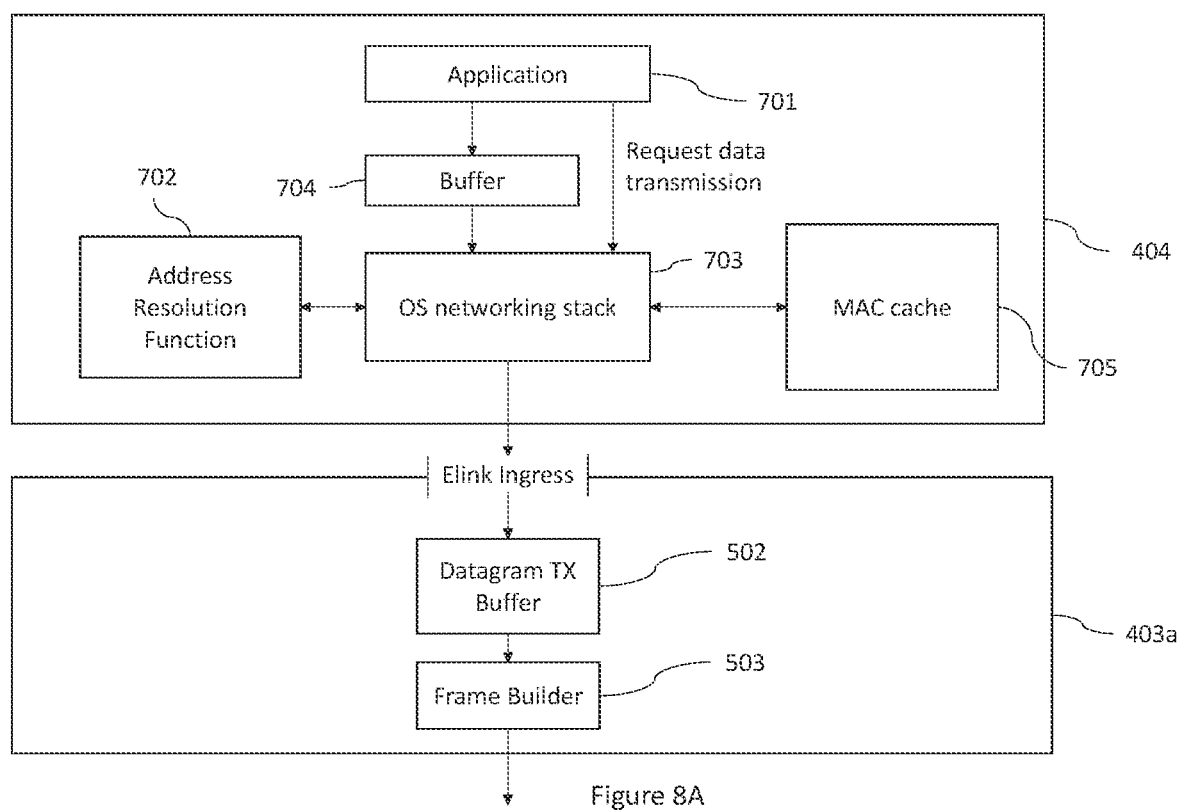
FIG. 8A illustrates the use of an address resolution function for dynamically providing MAC addresses to a networking stack for encapsulating datagram traffic for dispatch over a network.

Reference is made to FIG. 8A, which illustrates an embodiment in which the network protocol stack 703 obtains the destination MAC for a frame dynamically from the address resolution function 702.

The application 701 makes data for sending over the network 401 available to the network protocol stack 703 by storing this data in the buffer 704, which is accessible to the stack 703. The application 701 issues a request (which may take the form of a system call) to the networking stack 703 to request transmission of the data. The application 701 additionally provides the networking stack 703 with the indication of the physical location identifier or logical identifier of the device 400 to which the data is to be sent.

In response to the request from the application 701, the network stack 703 performs protocol processing in accordance with the protocol layers for which the data is be sent over the network 401. For example, the data may be encapsulated in a UDP header, with the resulting UDP datagram being encapsulated in an IP packet. As part of the protocol processing, the network stack 703 provides some of the fields of the Ethernet frame header, including the destination MAC address. In order to obtain the destination MAC address, the stack 703 first checks the cache 705 to determine whether the MAC address for the destination network interface device 403 is cached in the cache 705. If this MAC address is found in the cache 705, the stack 703 provides this as the destination MAC field of the frame header.

If the MAC address of the destination NIC 403 is not found in the cache 705, the stack 703 issues a request to the address resolution function 702 and provides with this request, the physical position identifier or logical identifier of the destination device 400 (which comprises the destination NIC 403). The address resolution function 702 implements a mapping function that maps the physical position identifier or logical identifier to a plurality of bits of the destination MAC address. The mapping function determines the plurality of bits of the MAC address in dependence upon the physical position identifier or logical identifier. The mapping function could be any suitable function such that those plurality of bits of the MAC address are predicable on the basis of the physical position or logical identifier. The plurality of bits of the MAC address represent an encoding of the physical position or logical identifier.

Once the networking stack 703 has obtained the MAC address of the destination NIC 403 from the address resolution function, this is inserted into the frame header by the networking stack 703 as the destination MAC. Processing logic of the MCPU 404 causes this MAC address to be cached in the cache 705 for subsequent access by the networking stack 703 when it is required to send further frames. The MAC address is cached in the cache 705 along with the corresponding physical position or logical identifier (and optionally the NIC 403 identifier), enabling look up of the destination MAC by the stack 703 for a further frame to be sent to the same destination NIC 403.

In addition to inserting the destination MAC address into the frame header, the network stack 703 also obtains and inserts the source MAC address into the frame header. The source MAC is the MAC address of the NIC 403a via which the frame will be sent onto the network 401. This address may be obtained in a similar manner to the destination MAC address. The stack 703 first checks the cache 705 to determine whether the MAC of NIC 403a is cached. This lookup may be performed using the identifier of the NIC 403a that distinguishes it from other NICs 403 of the same device 400. If the MAC is not located in cache 705, the stack requests the address resolution function 702 provide the MAC of NICs 403a. The stack 703 provides with this request, the physical position identifier or logical identifier of the device 400 including NIC 403a and includes the identifier of the NIC 403a. The mapping function (which is the same as the function applied to determine the destination MAC) is applied to determine the MAC of NIC 403a, which is inserted as the source MAC into the frame header by the stack 703. This MAC is cached in cache 705 for subsequent look up when sending further datagrams via the same NIC 403a.

Figure 8B:
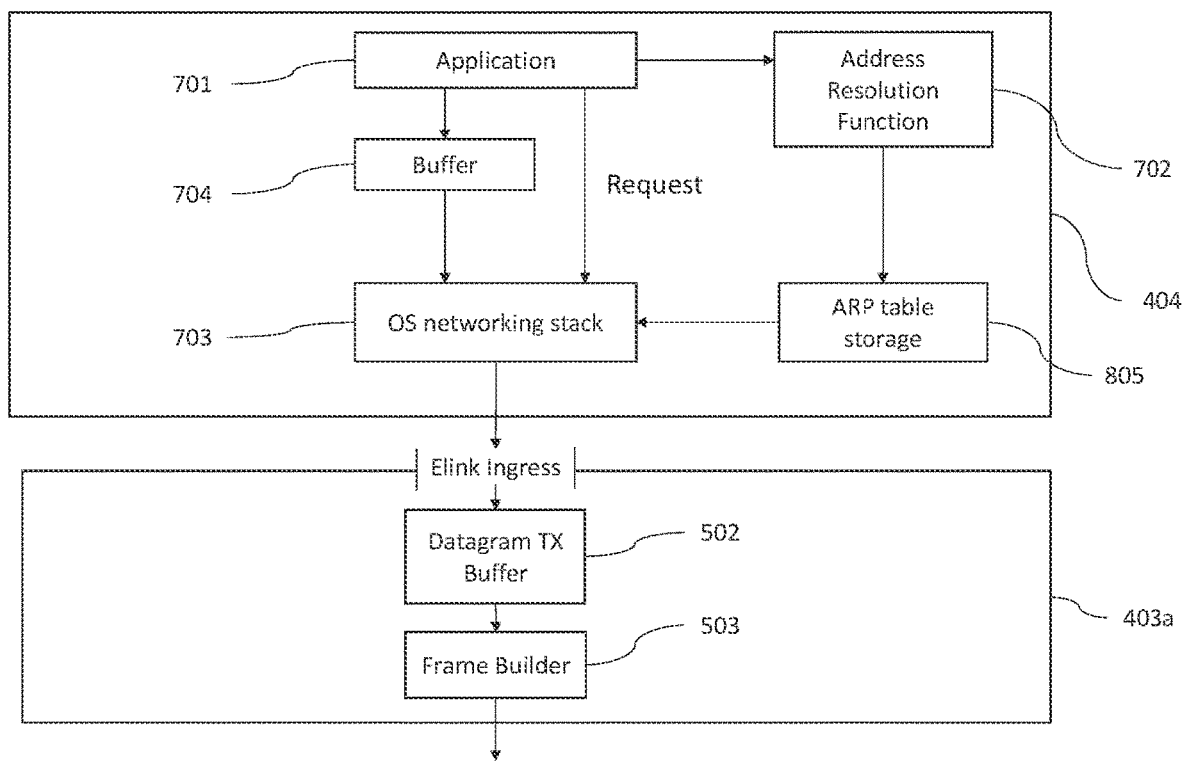
FIG. 8B illustrates the use of an address resolution function for providing MAC addresses in a static table accessible to a networking stack for encapsulating datagram traffic for dispatch over a network.

Reference is made to FIG. 8B, which illustrates an embodiment of the MCPU 404 stores a static table enabling look up of the MAC addresses by the stack 703.

The address resolution function 702 implements a mapping function (which may be the same as that described above with respect to FIG. 7A) from physical position identifiers or logical identifiers to MAC addresses. In this embodiment, the address resolution function 702 implements the mapping function to populate a look up table in the storage 805. This is done prior to the issuance of requests by the application to send data over the network 401. The application provides a list of physical position identifier or logical identifiers of devices 400 to the address resolution function 702, which using the mapping function, populates the table in storage 805. The application may additionally provide with each physical position identifier or logical identifiers, a NIC 403 identifier identifying a NIC 403 of the relevant device 400 for which the MAC is to be resolved.

As in the example of FIG. 8A, when the application 701 has data to send, the application 701 stores this data in a buffer 704 accessible to the network stack 703 and issues a request to the networking stack 703. In response, the networking stack 703 performs protocol processing of the data including obtaining the destination and source MAC addresses for the frame in which the data is to be dispatched. The stack 703 obtains the destination MAC address from storage 805 by searching the look up table using the physical location identifier or logical identifier (and optionally the NIC 403 identifier) of the destination provided by the application 701. The stack 703 obtains the destination MAC address from the storage 805 and provides this as part of the frame. The stack 703 also obtains the source MAC address from storage 805 by obtaining the MAC stored for the NIC 403a, which may be retrieved by searching the table in storage 805 using the NIC 403a identifier.

Once the partial frame has been constructed by the stack 703, processing circuitry of the MCPU 404 divides the frame into several parts and provides these parts in the payloads of ELink write requests to be written to the transmit buffer 502 of NIC 403a for dispatch over the network 401.

FIGS. 8A and 8B illustrates various components (including an application 701, a network stack 703, and an address resolution function 702) that are provided by at least one processor. These components may be provided by software instructions executing on a processor, may be implemented in dedicated hardware (e.g. FPGA or an ASIC), or a combination of the two. Additionally, the MCPU 404 includes processing circuitry for implemented further functions, e.g. for encapsulating parts of the frame in ELink packets, other than those illustrated in FIGS. 8A and 8B.

In the examples of both FIGS. 8A and 8B, the bits of the MAC address obtained by the mapping function in dependence upon the physical position identifier or logical identifier do not include all of the bits of the MAC address. In other words, the MAC address includes further bits for which the value is independent of the physical position or logical identifier of the destination device. These further bits comprise a bit identifying whether the MAC address is a global scope address (i.e. the MAC address is globally unique) or is a local scope address (i.e. is only guaranteed to be unique on the local area network over which frames are sent using that address).

It has been described that the networking stack 703 derives the MAC addresses on the basis of a physical position identifier or logical identifier supplied by the application 701. In embodiments, the physical position identifier or logical identifier of a device 400 takes the form of the IP address of the device 400, with the IP address encoding the physical position or logical identifier of the device 400.

Figure 10:
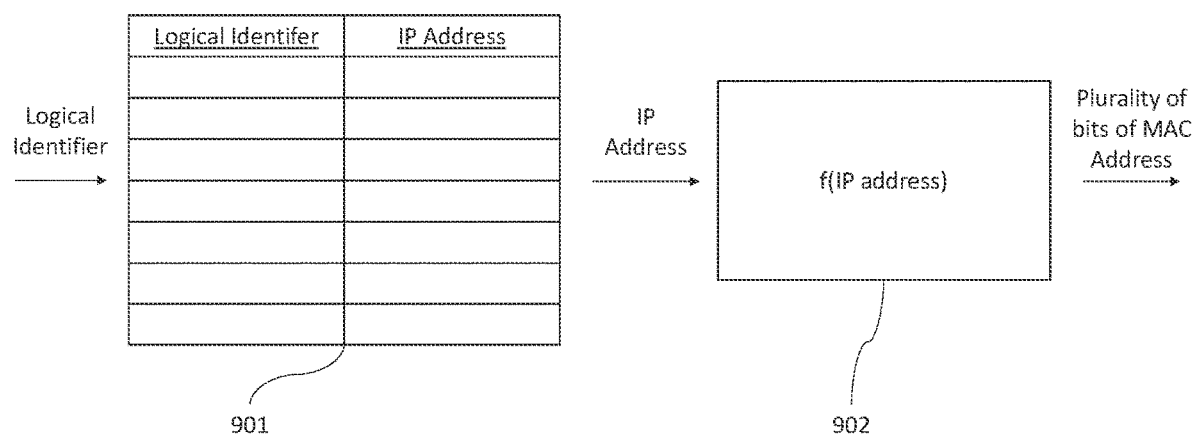
FIG. 10 illustrates an example of the look-up of a MAC address for a destination based on the IP address for that destination.

Reference is made to FIG. 10, which illustrates the translation from a logical identifier to a MAC address according to one embodiment. The application 701 provides the logical identifier of the destination to which data is to be dispatched. Processing circuitry in the MCPU 404 translates the logical identifier to the IP address. The processing performed to translate the logical identifier to the IP address may be part of the processing of the application 701 itself or may be processing performed by an additional software entity, which is also implemented by the at least one processor of the MCPU 404, that intercepts the logical identifier issued by the application 701 and passes this to the networking stack 703. This translation may be performed using the table 901 as shown in FIG. 10, in which the IP address is looked up on the basis of the logical identifier. Although in FIG. 10 the IP address is identified on the basis of the logical identifier, the IP address could comprise an encoding of the physical position of the device 400 having that IP address.

As shown in FIG. 10, the IP address is provided to the mapping function 902, which is part of the address resolution function 702. The mapping function 902 maps the physical position or logical identifier (which in this case takes the form of the IP address) to a plurality of bits of the MAC address as discussed above.

It has been described that the address resolution function 702 derives the MAC address on the basis of either a physical location identifier or a logical identifier. In the case that the physical location identifier is used, the application 701 may derive the physical location identifier of a device 400 to which data is to be sent (and therefore for which a MAC address needs to be determined) on the basis of a logical identifier of that device 400. The application may access a mapping table that maps the logical identifier to the physical location identifier. This mapping may be determined in accordance with any suitable protocol for determining the physical location identifier of the devices. Having obtained the physical location identifier for the destination device 400, the application 701 provides this to the address resolution function 702 for deriving the MAC address of the destination device 400.

According to embodiments of the second invention, one or more bits of the MACs (i.e. the source MAC and destination MAC) for a frame are reserved for distinguishing frames issued prior to a reset event from frames issued after a reset event. These one or more bits are referred to as a generation number. The generation number is updated each time a distributed application executing across the system is reset.

Figure 11:
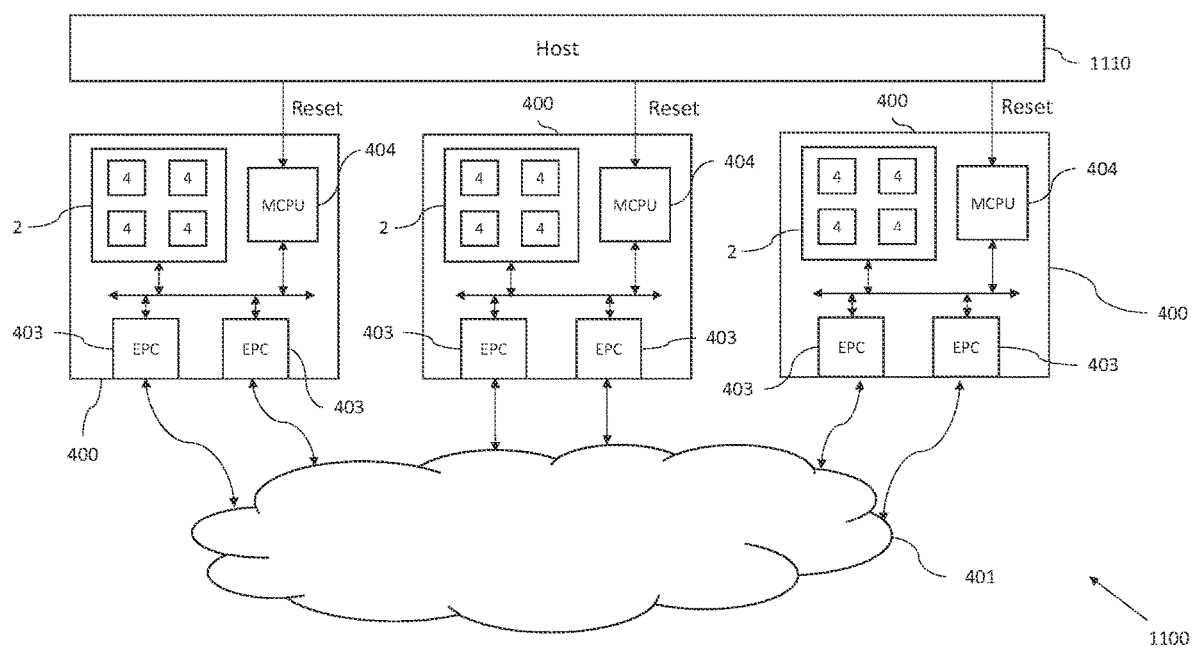
FIG. 11 illustrates a system comprising a plurality of devices being reset by a host device.

Reference is made to FIG. 11, which illustrates an example of a system 1100 comprising a plurality of devices 400. The processing units 2 of the devices are each responsible for executing part of a distributed application (not to be confused with application 702 discussed above) running across the system 1100. A first of the processing units 2 sends packets to a second of the processing units 2 by issuing ELink write requests to the NIC 403 associated with a connection established between the two devices 400 on which the processing units 2 are implemented. The NIC 403 that receives these write requests encapsulates the write requests into frames and dispatches them over the network 401 to the device 400 comprising the second processing unit 2. Hardware (e.g. switches and routers) in the network 401 routes the frames to the NIC 403 of the device 400 that comprises the second of the processing units 2. This recipient NIC 403 extracts the ELink write requests from the frames and provides these to the second of the processing units 2. The payloads of the ELink write requests are written to the memory locations identified in the ELink headers in the tile/s 4 identified in the ELink header.

A first MCPU 404 may communicate with a second MCPU 404 over the network 401 by writing a partial frame to the transmit buffer of a NIC 403 on its device 400. This sending NIC 403 causes this partial frame to be completed and then dispatched over the network 401 to a NIC 403 of the device 400 that comprises the second MCPU 404. The recipient NIC 403 of this device 400 signals the second MCPU 404, which then read the frame from a buffer of the recipient NIC 403.

At a certain point during processing of the distributed application, an uncorrectable error may be detected. Such an error may, for example, be an error occurring during processing performed by an execution unit in one of the tiles 4 or may be an error occurring when data is stored in memory of a tile 4 or elsewhere. Such an error may be a random error resulting, e.g. from ionising radiation. The error is detected by an apparatus 1110, shown as a host system 1110, which compares signatures periodically output by the devices 400. The apparatus 1110 provides an indication of a reset to the devices 400 of the system 1100. This reset indication is provided at least to the MCPUs 404. As part of the reset process, the distributed application is restarted to an earlier point. This earlier point may be the start of the application, such that the application is rerun from the beginning. Alternatively, the earlier point may be a checkpoint, in which case checkpoint data is loaded into the processing units 2 from the host 1110 to restart the application from the checkpoint.

When restarting the application, the MACs for the NICs 403 in the system 1100 are updated so as to protect the application from any stale packets in the network 401 that may have been dispatched onto the network 401 prior to the reset of the application. Such stale packets may be held in the buffers of switches and routers from which they are only output after an unusually long period of time. Additionally, there is the possibility of race conditions in which not all devices 400 in the system 1100 are reset at the same time, such that one or more devices 400 operating in a pre-reset state may output packets that could be accepted by devices 400 operating in a post-reset state. If accepted by a device 400 in the system 1100, such packets may interfere with the application processing on that device and cause errors.

To prevent such interference, the updating of the MACs for the NICs 403 in the system 1100 occurs by each of the MCPUs 404 updating one or more bits (referred to herein as the generation number) of the MAC addresses of the NICs 403 in response to reset events.

Figure 12:
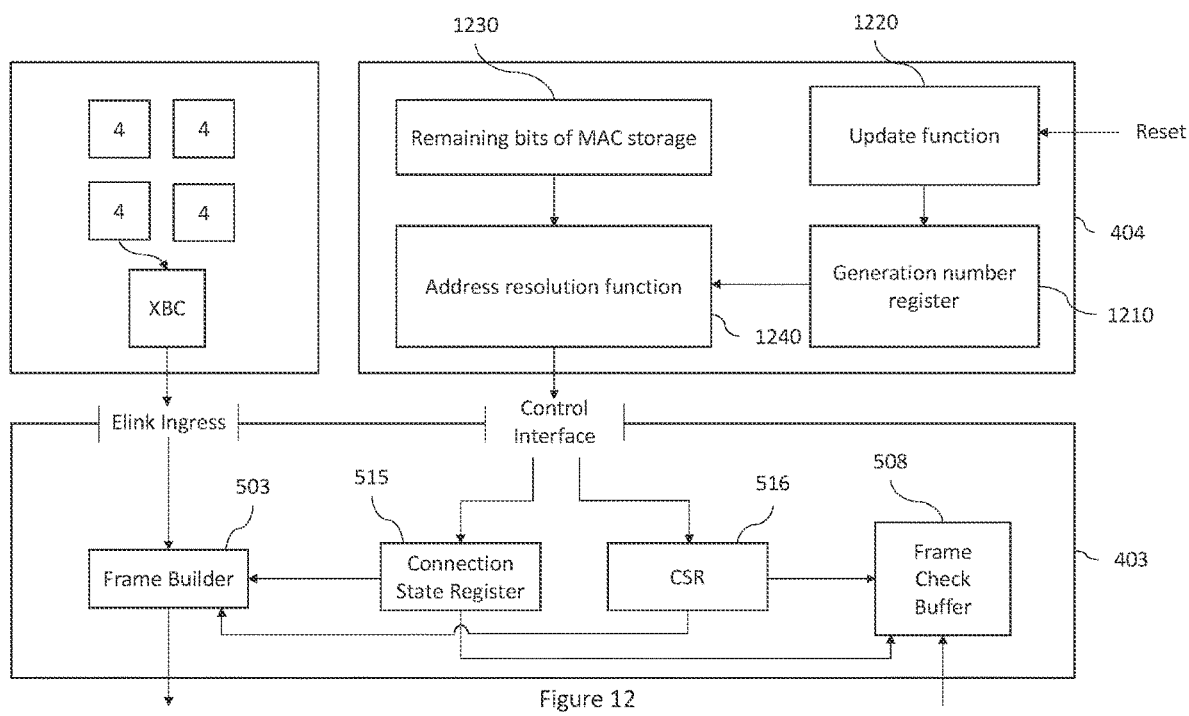
FIG. 12 illustrates the use of an address resolution function for providing updated MAC addresses in response to an update of a generation number, wherein the updated MAC addresses are for use in providing connection traffic.

Reference is made to FIG. 12, which illustrates how the MCPU 404 may update the MACs for a connection in a response to a reset event. The MCPU 404 comprises a generation number register 1210, which stores the current generation number that is provided as part of each MAC address output by the address resolution function 1240. The processing circuitry of the MCPU 404 supports an update function 1220 that updates the generation number held in the generation number register 1210.

When an indication of a reset event is received at the MCPU 404, the update function 1220 responds to this reset event by updating the value of the generation number held in the generation number register 1210. The update of the generation number held in the generation number register 1210 may comprise incrementing the current value of the generation number by one. For example, suppose that the generation number consists of five bits, with the current value of the generation number held in the register 1210 being given by the bit sequence: 00001. In response to a reset event, the update function 1220 updates the generation number by increasing the value by one to: 00010.

Since the generation number comprises a finite number of bits, in the case that the current value of the generation is equal to the maximum possible value, the updating of the generation number comprises resetting the generation number to the lowest possible value. For example, suppose that the generation number consists of five bits, with the current value of the generation number held in the register 1210 being given by the bit sequence: 11111. In response to a reset event, the update function 1220 resets the generation number to the lowest possible value given by: 00000. Therefore, the generation number is updated by the update function 1220 in a wraparound manner.

In response to the indication of the reset event, the address resolution function 1240 determines updated MAC addresses for the connections participated in by the device 400. As noted, one or more bits are reserved in each MAC address for representing the generation number. The address resolution function 1240 sets these bits to the value of the new generation number stored in the register 1210 by the update function. The remaining bits in each MAC address are set to the same values as before the reset event.

For each MAC address, the remaining bits of that MAC address may be determined in different ways. In some embodiments, these bits may be held in a storage 1230 accessible to the address resolution function 1240 and concatenated with the bits of the new generation number to form a full MAC address. These bits held in the storage 1230 are not wiped in response to the reset event, but persist and do not change following the reset event. In this embodiment, the storage 1230 stores the remaining bits (i.e. those bits other than the bits of the generation number) for each of the MAC addresses for which the address resolution function 1240 is responsible for determining. The address resolution function 1240 provides each of these MACs by combining the same generation number with the remaining bits for the respective MAC.

In some embodiments, the address resolution function 1240 may determine the remaining bits for each MAC address by applying a mapping function to a physical position identifier or logical identifier of the device 400 comprising a NIC 403 having that MAC address. This represents an embodiment in which the first and the second invention are combined, and will be described in more detail with reference to FIGS. 14 and 15.

Figure 13:
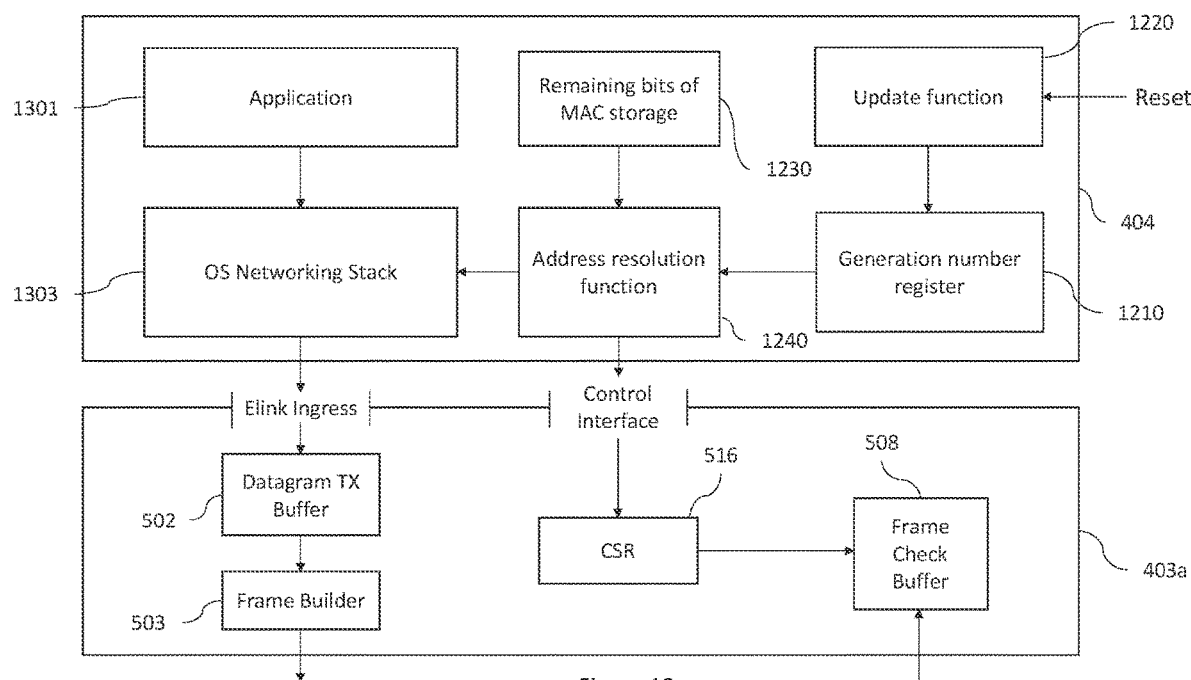
FIG. 13 illustrates the use of an address resolution function for providing updated MAC addresses in response to an update of a generation number, wherein the MAC addresses are for insertion into frames comprising datagrams.

Reference is made to FIG. 13, which illustrates how the MCPU 404 may provide MACs used for datagram traffic, wherein one or more values of those MACs depend upon the occurrence of reset events.

As shown, at least one processor of the MCPU 404 provides an application 1301, an operating system network stack 1303, and the address resolution function 1240. When the application 1301 has data to send over the network 401, it provides this data to the network stack 1303 for protocol processing. The OS network stack 1303 provides part of the Ethernet header, including the destination MAC address and the source MAC address. These MAC addresses are obtained by the stack 1303 from the address resolution function 1240. As part of each MAC address, the address resolution function 1240 provides the current generation number, which it obtains from the generation number register 1210.

For each MAC address, the remaining bits (i.e. those bits other than the generation number) may be held in a storage 1230 accessible to the address resolution function 1240 and concatenated with the bits of the new generation number to form a full MAC address. These bits held in the storage 1230 are not wiped in response to the reset event, but persist and do not change following the reset event. In this embodiment, the storage 1230 stores the remaining bits (i.e. those bits other than the bits of the generation number) for each of the MAC addresses for which the address resolution function 1240 is responsible for determining. The address resolution function 1240 provides each of these MACs by combining the same generation number with the remaining bits for the respective MAC.

To obtain the MAC addresses used as destination MAC address and source MAC addresses by the network stack 1303, the address resolution function 1240 obtains the fixed bits of each of the MAC addresses from the storage 1230. For each of the two MAC addresses, the bits obtained from the storage 1230 are each combined with the current generation number held in the generation number register 1210. The results of combining each of the two strings of fixed bits from storage 1230 with the generation number are the destination MAC and the source MAC. The destination MAC address is the MAC address of the destination NIC 403 to which the data frame is to be sent over the network 401. The source MAC address is the MAC address of the NIC 403a, shown in FIG. 13, via which the data frame is to be sent.

The address resolution function 1240 provides the source MAC and destination MAC for the data frame to the network stack 1303. In some embodiments, the address resolution function 1240 may provide these to the stack 1303 in a dynamic manner, i.e. the address resolution function 1240 may determine the MAC addresses by combined the bits from storage 1230 with the generation number 1210 when requested by the stack 1303. Alternatively, the address resolution function 1240 may provide a semi-static table in memory that is accessible to the networking stack 1303, where this table comprises the MAC addresses for the NICs 403 accessible on the network 401 for look up by the stack 1303. In this case, all of the MAC address in the table are updated by the address resolution function 1240 whenever the generation number held in register 1210 is updated by the update function 1220.

When it obtains the source MAC address and destination MAC address, the stack 1303 provides these as part of a header of the frame to be sent over the network 401. Circuitry of the MCPU 404 then causes the partial data frame to be written over an interconnect of the device 400 to the datagram transmit buffer 502 of a NIC 403a of the device 400. The frame builder 503 accesses the datagram transmit buffer 502 and completes the partial data frame, e.g. by adding the preamble and FCS, and cause the frame to be sent over the network 401.

The update function 1220 is configured to update the generation number held in the generation number register 1210 in response to a reset event. As described, the update function 1220 may update the generation number by incrementing the number or, if the number has reached its maximum value, resetting it to zero. The update of the generation number has the consequence that the address resolution function 1240 will provide the MAC addresses for subsequent data frames (i.e. those sent after the reset event) in accordance with the updated generation number. In the case that the MAC addresses are supplied to the stack 1303 by the address resolution function 1240 in a dynamic manner, the address resolution function 1240, when the stack 1303 requests the source MAC address and destination MAC address for a frame, obtains these using the updated generation number. In the case that the MAC addresses are supplied to the stack 1303 by the address resolution function 1240 using a semi-static table, in response to the update of the generation number in register 1210, the address resolution function 1240 updates all of the MAC addresses held in the table by updating the generation numbers in those MAC addresses. Subsequently, when the stack 1303 requires destination MAC addresses and source MAC addresses for data frames to be sent, these are obtained from the table and provided as part of the frame header. The fixed bits in the storage 1230 for each MAC address do not change in response to a reset event. Therefore, these same bits are used by the address resolution function 1240 when deriving the MAC addresses both before and after the reset events.

The address resolution function 1240, in addition to supplying the MAC addresses for insertion into the frame for datagram traffic, is also configured to write the source MAC address for the datagrams sent via NIC 403a to the CSR 516. This enables circuitry of the NIC 403a to check the destination MAC in received datagrams against its own MAC so as to check that they match. If the MAC of NIC 403a held in the CSR 516 does not match the destination MAC in a received frame, that received frame is not accepted by the NIC 403a. The address resolution function 1240 provides an updated MAC to be written to the CSR 516 by circuitry of the MCPU 404 whenever a reset event occurs, the updated MAC including the updated generation number. The MCPU 404 provides an updated MAC to the CSRs 516 of each of the NICs 403 of its device 400 in this manner.

Figure 14:
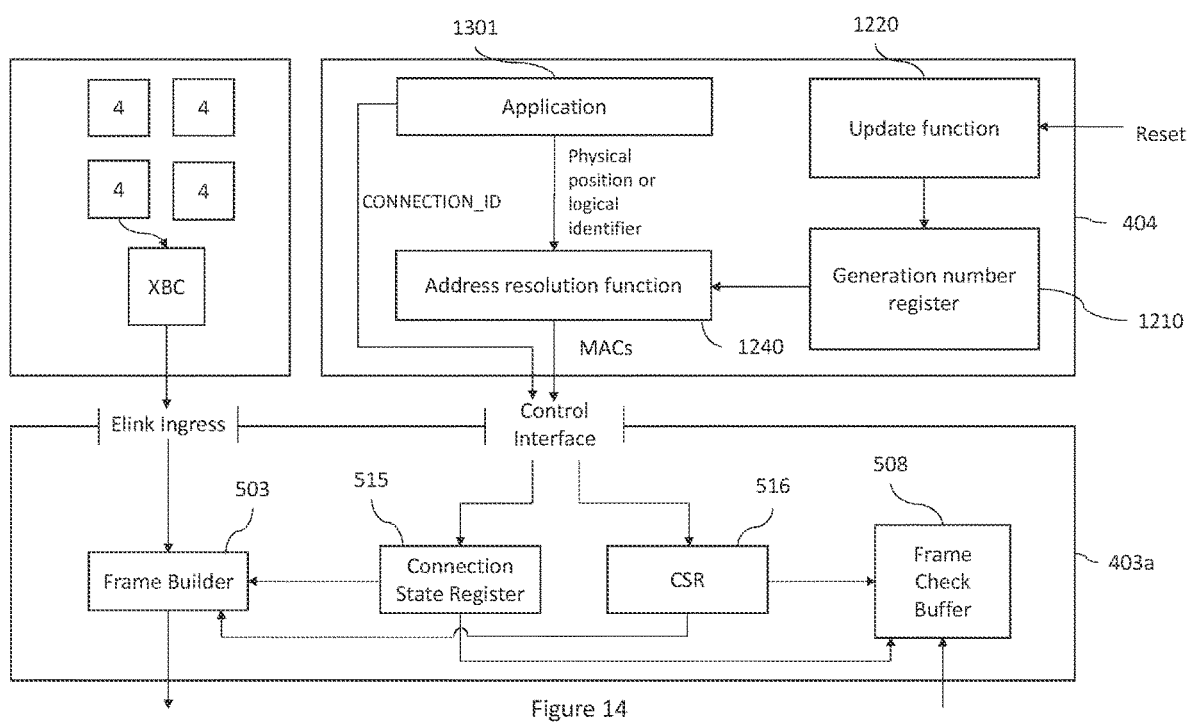
FIG. 14 illustrates the use of an address resolution function for providing MAC addresses in dependence upon physical position identifiers or logical identifiers, and in dependence upon a generation number, wherein the MAC addresses are for use in providing connection traffic.

Reference is made to FIG. 14, which illustrates an embodiment in which the first and the second invention are combined for providing the MAC addresses for connection traffic. In this case, the address resolution function 1240 determines the MAC addresses for a connection in dependence upon the physical position identifiers or logical identifiers of the devices 400 communicating over the connection, and in dependence upon the current generation number held in the register 1210.

The application 1301 provides the physical position identifier or logical identifiers of the devices 400 comprising the NICs 403 that will communicate over the connection to the address resolution function 1240. The address resolution function 1240 applies a mapping function to determine some of the bits of each of the two MAC addresses in dependence these physical positions or logical identifiers. This is performed in the manner described above with respect to FIG. 7. The address resolution function 1240 also provides as part of the two MAC addresses, a local scope indicator and bits dependent upon the NIC 403 identifiers. The remaining bits of each MAC address are the generation number, which is obtained from the generation number register 1210.

Once the MAC addresses for the connection are determined by the address resolution function 1240, circuitry of the MCPU 404 provides these over the control interface of the NIC 403a. The MAC address for the remote NIC 403, to which the NIC 403a shown in FIG. 14 sends data frames, is written to the connection state register 515. The MCPU 404 also writes the connection identifier (shown as CONNECTION_ID) to the connection state register 515. The MAC address for the NIC 403a is written to the CSR 516 of the NIC 403a. These MAC addresses are then available for use in sending and receiving data frames over the relevant connection as described above with respect to FIGS. 7 and 12.

Figure 15:
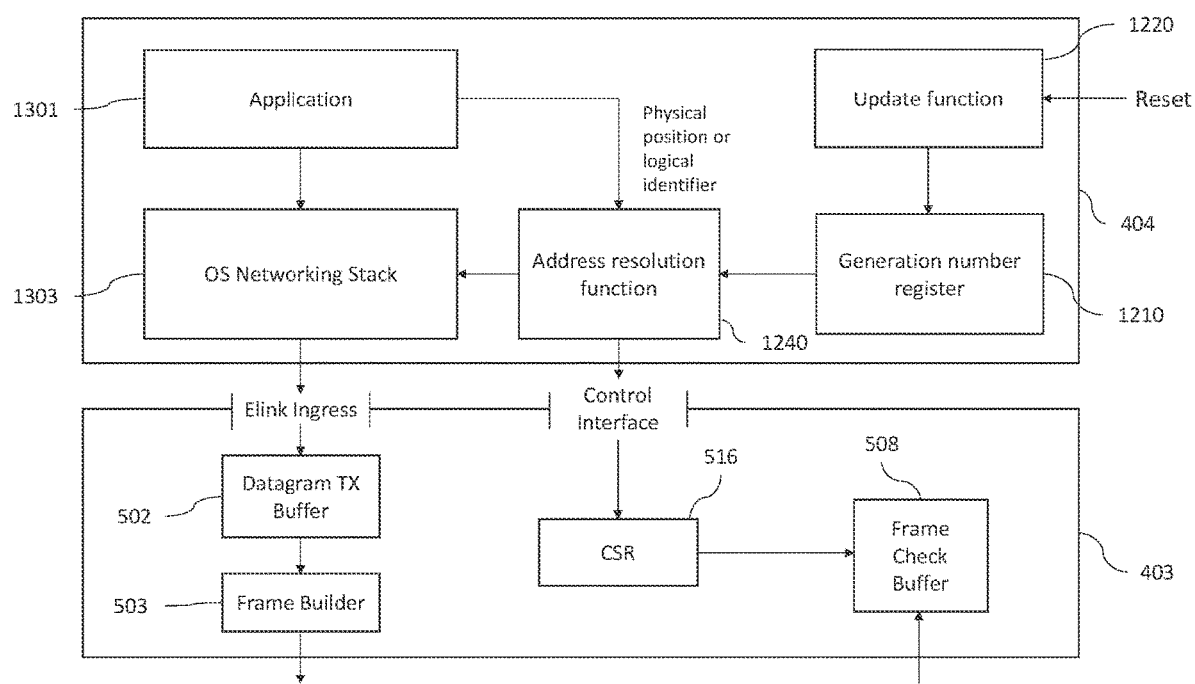
FIG. 15 illustrates the use of an address resolution function for providing MAC addresses in dependence upon physical position identifiers or logical identifiers, and in dependence upon a generation number, wherein the MAC addresses are for insertion into frames comprising datagrams.

Reference is made to FIG. 15, which illustrates an embodiment in which the first and the second invention are combined for providing datagram traffic.

In this embodiment, the address resolution function 1240 determines the MAC addresses for datagram traffic in dependence upon the physical position identifier or logical identifiers of the devices 400 comprising the NICs 403, and in dependence upon the current generation number held in the register 1210.

The application 1301 provides the physical position identifier or logical identifiers of the devices 400 comprising the NICs 403 between which a datagram is to be sent over the network 401. These may be provided to the address resolution function 1240, so that the address resolution function 1240 provides a table of MAC addresses accessible to the stack 1303 (as described above with respect to FIG. 8B). Alternatively, these may be provided to the stack 1303, which requests the corresponding MAC address from the address resolution function 1240 (as described above with respect to FIG. 8A). The address resolution function 1240 applies a mapping function to determine some of the bits of each of the two MAC addresses in dependence these physical position identifier or logical identifiers. This is performed in the manner described above with respect to FIGS. 8A and 8B. The address resolution function 1240 also provides as part of the two MAC addresses, a local scope indicator and bits dependent upon the NIC 403 identifiers. The remaining bits of each MAC address constitute the generation number, which is obtained from the generation number register 1210.

The network stack 1303 obtains the MAC addresses provided by the address resolution function 1240 and provides these as part of a partial data frame written to the buffer 502. The frame builder 503 completes the frame and causes it to be dispatched over the network 401.

In the same manner as described above with respect to FIG. 13, the address resolution function 1240 also provides the MAC of the NIC 403a to be written to the CSR 516 of the NIC 403a. In the embodiment of FIG. 15, this MAC is determined on the basis of the physical position or logical identifier of the NIC 403a and on the basis of the generation number from register 1210.

Figure 16:
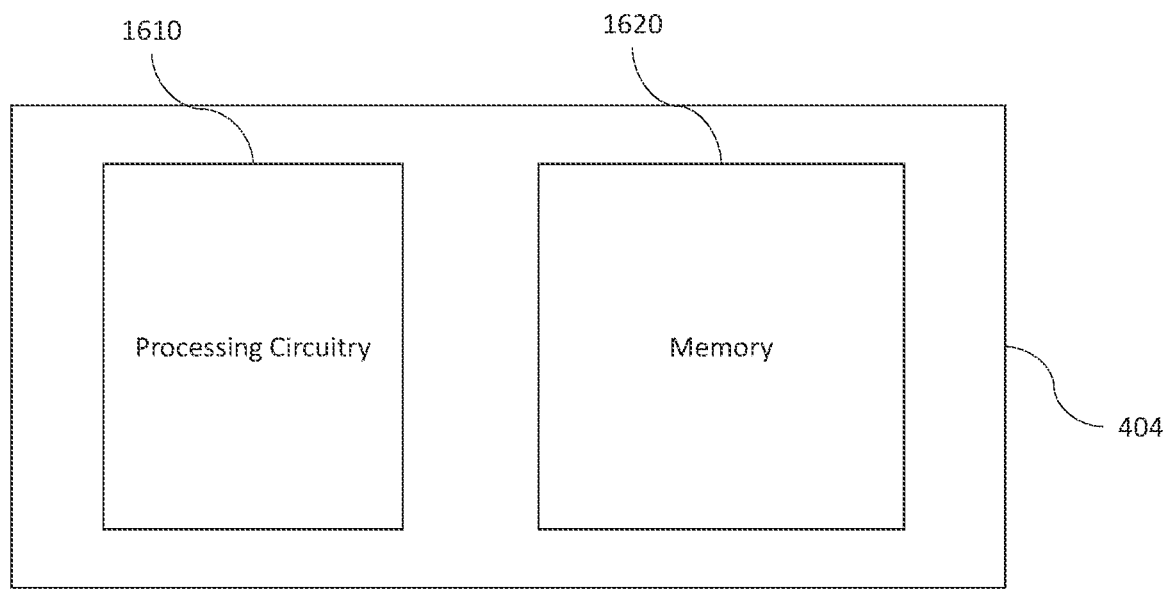
FIG. 16 is a schematic diagram of a management processor of a device.

Reference is made to FIG. 16, which illustrates an example embodiment of the MCPU 404. The MCPU 404 comprises processing circuitry 1610 and a memory 1620. The processing circuitry 1610 may comprise one or more processors configured to execute computer readable instructions stored in memory 1620. Additionally, the processing circuitry 1610 may comprise dedicated hardware, e.g. one or more field programmable gate arrays (FPGAs) or application specific integrated circuits (ASICs), for performing operations of the MCPU 404. The processing circuitry 1610 performs the operation described above as being performed by the MCPU 404.

Embodiments have been described in which the address resolution function is implemented in the MCPU 404, which is part of the same device 400 as the NICs 403 and processing unit 2. However, in other embodiments, the address resolution function may be implemented in separate hardware.

Figure 17:
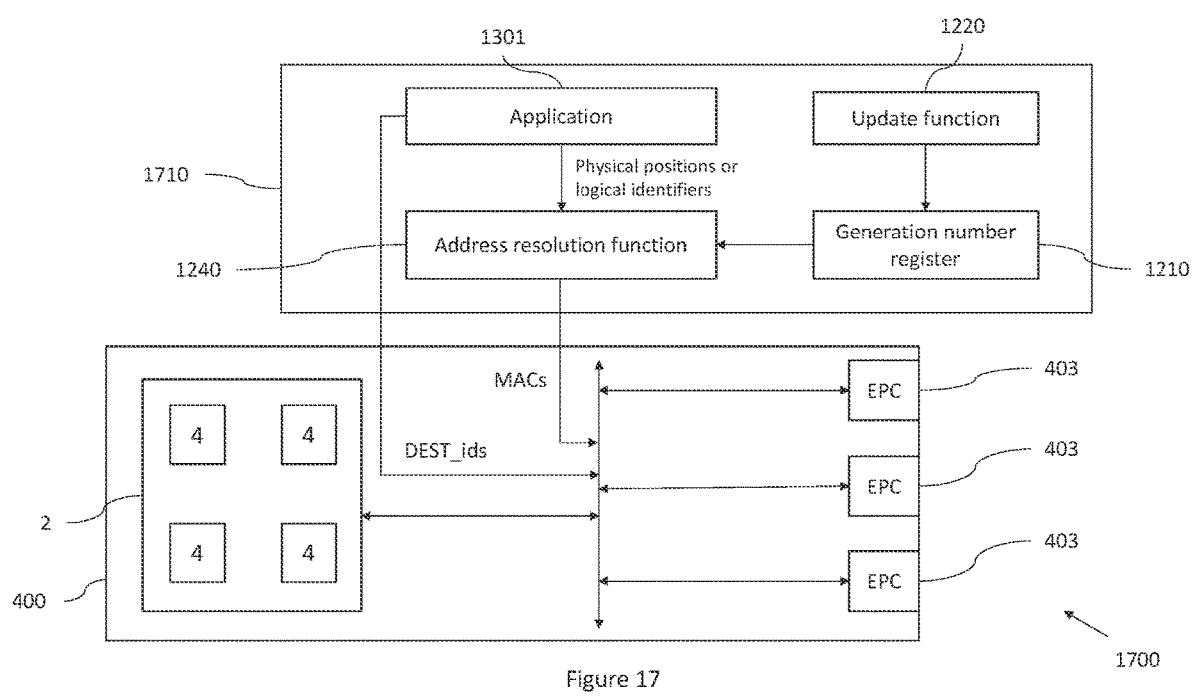
FIG. 17 illustrates a system in which the address resolution function is implemented in a device that is separate to the chip comprising the network interface devices that dispatch frames comprising the MAC addresses.

Reference is made to FIG. 17, which illustrates a system 1700 comprising the device 400 and a further device 1710. The further device 1710 comprises at least one processor supporting the application 1301, address resolution function 1240, and generation number update function 1220, which function as described above with respect to FIG. 14. The address resolution function 1240 is configured to provide to each of the NICs 403, the MACs for the connections supported by those NICs 403. Similarly, the application provides to the NICs 403, the connection identifiers for the devices on the other end of each of these connections. These operations to provide the MACs and the connection identifiers are performed for each NIC 403 in the manner described above with respect to FIG. 14 for the NIC 403a shown in FIG. 14. The processing unit 2 may send and receive data over the network 401 with multiple destinations using the multiple configured NICs 403.

Figure 18:
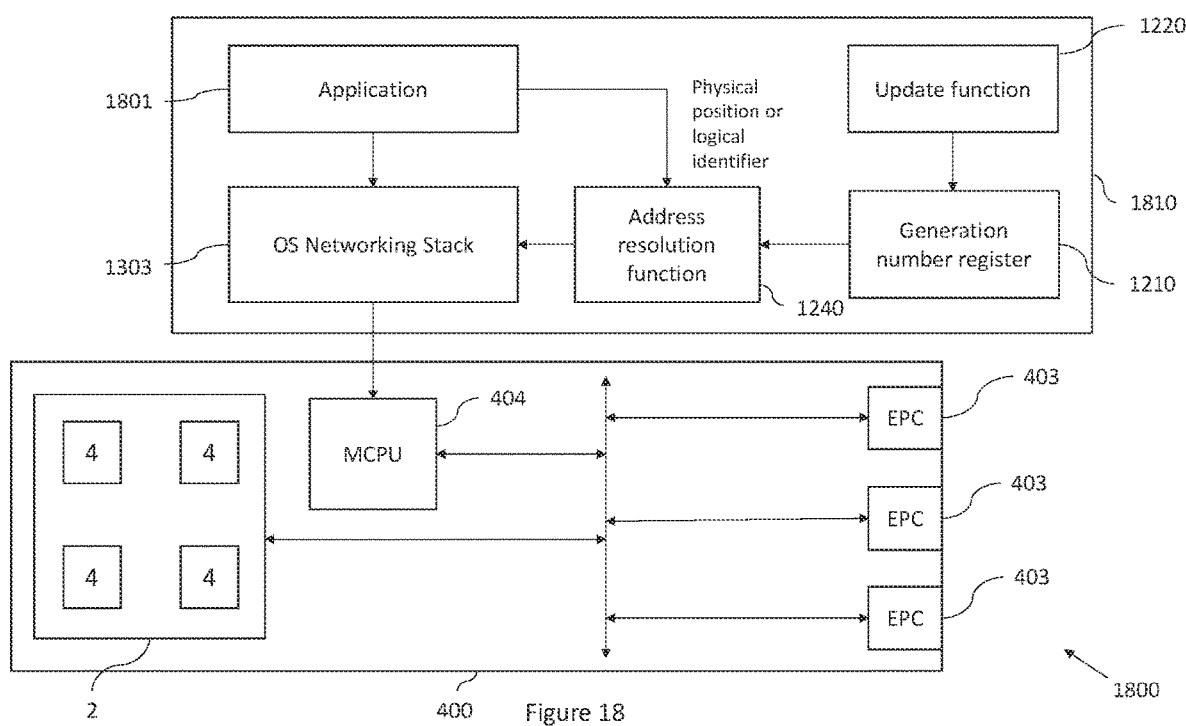
FIG. 18 illustrates a system in which the address resolution function and application are implemented in a device that is separate to the network interface devices that dispatch frames comprising the MAC addresses.

Reference is made to FIG. 18, which illustrates an example of a system 1800 comprising the device 400 and a further device 1810. The further device 1810 may be a host device, such as host 1110. The further device 1810 comprises at least one processor supporting a network stack 1303, address resolution function 1240, and generation number update function 1220. These supported components function as described above with respect to FIG. 15. The at least one processor of the further device 1810 also supports an application 1801, which may function in the same manner as application 1301 for transmitting data over the network 400. In the example of FIG. 18, the MPCU 404 acts as a hardware proxy for delivering data provided by the device 1810 to the relevant NIC 403 for transmission over network.

When the application 1801 has data to send over network 400, this data is provided to the stack 1303, which obtains the MAC addresses for the source and destination and provides a partial frame comprising the data and these MAC addresses. The partial frame is written to a buffer of the MCPU 404. The MCPU 404 then writes the partial frame to a buffer of one of the NICs 403, which causes that data to be sent over the network 400. The MCPU 404 may still support its own versions of the application 1301, network stack 1303, address resolution function 1240, and generation number update function 1220, enabling it to send datagram traffic as described above with respect to FIG. 15 in parallel with acting as a hardware proxy for the data received from further device 1810.

On the receive side, the MCPU 404 reads frames from the NICs 403 and examines those frames to determine whether the frames should be forwarded to the device 1810 or processed by the MPCU 404 itself. This determination may be made on the basis of information contained at a protocol layer that is higher than the link layer. If a frame is to be processed by the device 1810, the MPCU 404 forwards the frame to the device 1810, where it is receive protocol processed by the stack 1303 and the data contained therein delivered to the application 1801. If a frame is to be processed by the MCPU 404, the stack 1303 of the MCPU 404 performs the receive protocol processing and delivers the data contained therein to the application 1301.

Figure 9A:
FIG. 9A illustrates an example structure of a MAC address derived partly on the basis of a physical position identifier.

Reference is made to FIG. 9A, which illustrates an example of a MAC address 900, which may be formed according to embodiments of the first invention. The MAC address 900 is MAC address for a NIC 403. The example MAC address 900 may be derived by the address resolution function applying the mapping function to a physical position identifier of a device 400 comprising the NIC 403 and an identifier of the NIC 403 on that device 400.

The MAC address 900 comprises a first octet 910 of bits. Each of these bits 910 is independent of the physical position or identifier of NIC 403 and may be used to provide additional information. For example, bits b2 indicates that the MAC address is a local scope MAC address. Bit b1 indicates whether the MAC address is a unicast MAC address.

The MAC address comprises a second octet 911 of bits. These bits 911 identify a pod (i.e. a collection of racks) to which the NIC 403 having the MAC 900 is defined. The bits 912 form a rack number, identifying a rack to which the NIC 403 having the MAC 900 belongs. The bits 913 identify a device 400 within the identified rack. The bits 914 form a NIC identifier and server to distinguish the NIC 403 having the MAC 900 from other ones of the plurality of NICs 403 on the device 400 that is identified by the bits 913.

Figure 9B:
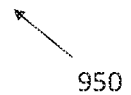
FIG. 9B illustrates an example structure of a MAC address including a generation number and derived partly on the basis of a logical identifier.

Reference is made to FIG. 9B, which illustrates an example of a MAC address 950, which may be formed according to embodiments of both the first and second invention. The MAC address 950 is a MAC address for a NIC 403.

The MAC address 950 comprises a first octet 910 of bits. This first octet 910 may be identical to the first octet 910 of the MAC address 900 described above. The bits 910 are independent of the generation number and the position or logical identical identity of the device 400 comprising the NIC 403 having the MAC address 950.

The MAC address 950 comprises a set of bits 961, referred to as the GSD tag number. In embodiments, five of the 16 bits of the GSD tag number constitute the generation number, which is updated in response to reset events. The remaining 11 bits of the GSD tag number form a job identifier, which is updated for each job run on the system of devices 400.

The MAC address 950 comprises a further set of bits 962, referred to as the logical port number. The logical port number identifies the NIC 403 having the MAC 950 from amongst all of the NICs 403 of the system on which the application runs. The logical port number is derived by the address resolution function on the basis of the logical identifier of the device 400 to which the NIC 403 having the MAC 950 belongs and on the basis of an identifier of the NIC 403 that distinguishes that NIC 403 from other NICs 403 belonging to the same device 400.

Figure 19:
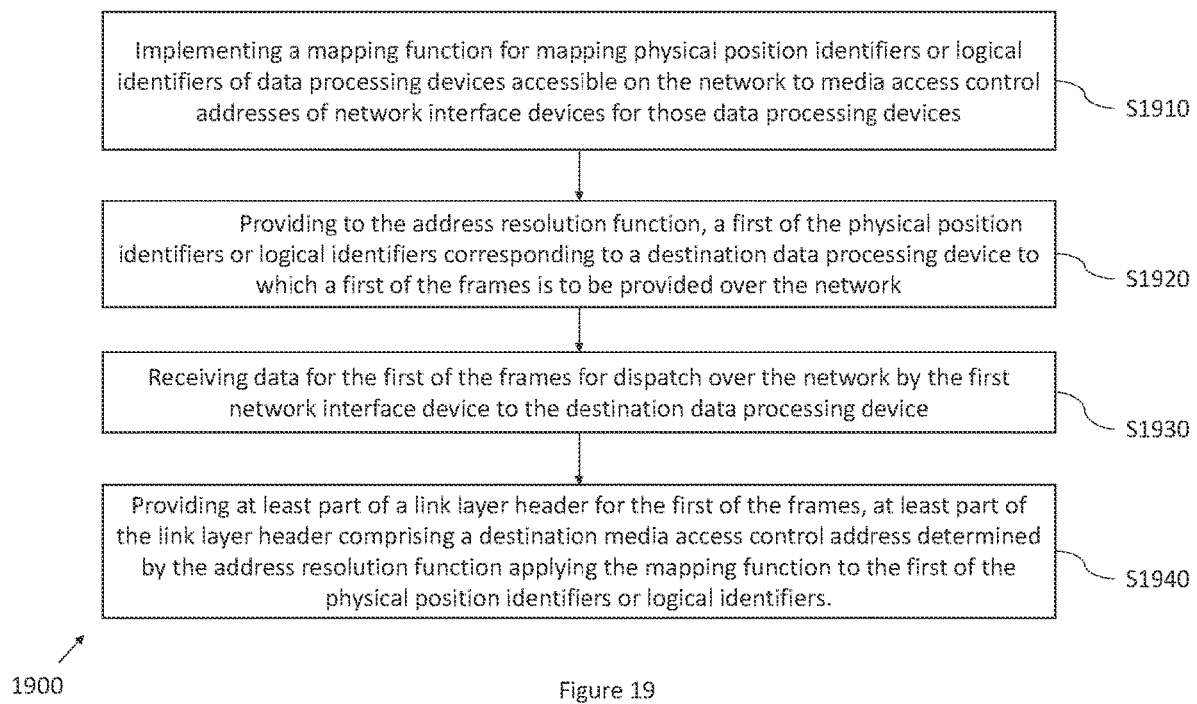
FIG. 19 illustrates a method according to embodiments of the first invention.

Reference is made to FIG. 19, which illustrates a method 1900 according to embodiments of the first invention.

At S1910, an address resolution function implements a mapping function for mapping physical position identifiers or logical identifiers of data processing devices accessible on the network to media access control addresses of network interface devices for those data processing devices.

At S1920, an application provides to the address resolution function, a first of the physical position identifiers or logical identifiers corresponding to a destination data processing device to which a first of the frames is to be provided over the network.

At S1930, a protocol processing entity receives data for a first of the frames, the data being for dispatch over the network to the destination data processing device. The protocol processing entity may be a stack 703, 1303 or may be provided by the NIC frame builder 503.

At S1930, in response to receipt of data for the first of the frames for dispatch over the network to the destination data processing device, the protocol processing entity provides at least part of a link layer header for the first of the frames, the at least part of the link layer header comprising a destination media access control address determined by the address resolution function applying the mapping function to the first of the physical position identifiers or logical identifiers.

Figure 20:
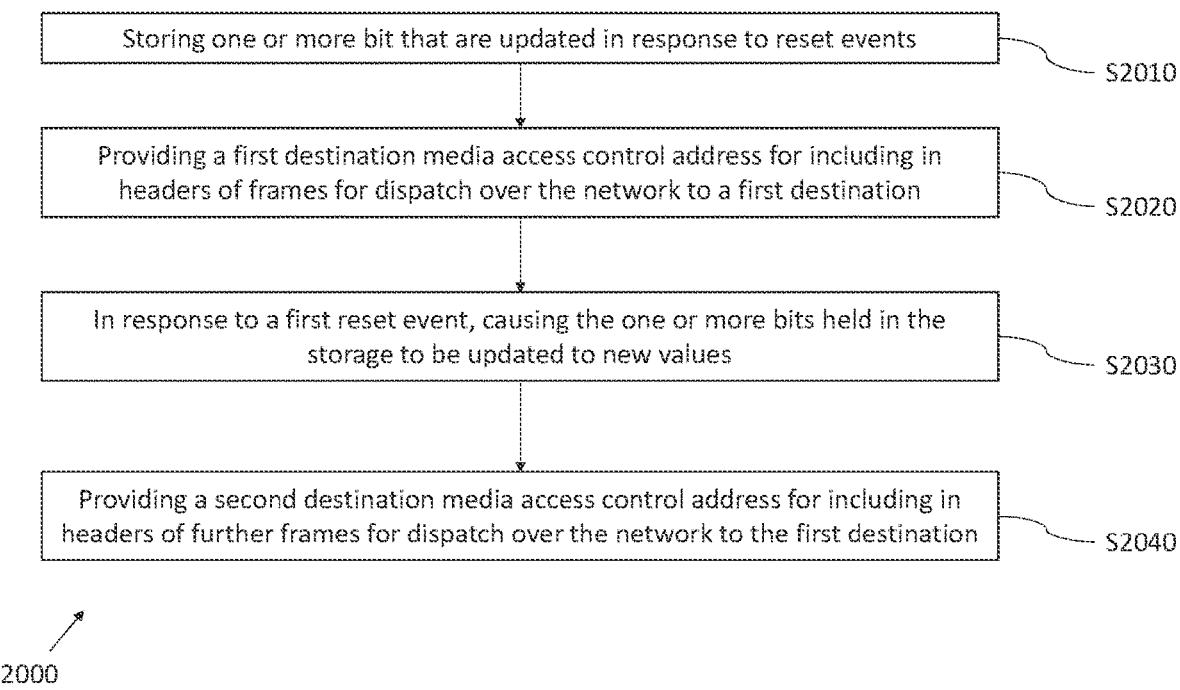
FIG. 20 illustrates a method according to embodiments of the second invention.

Reference is made to FIG. 20, which illustrates a method 2000 according to embodiments of the second invention.

At S2010, the storage 1210 stores one or more bits that are updated in response to reset events.

At S2020, the address resolution function 1240 provides the first destination media access control address for including in headers of frames for dispatch over the network to a first destination, the first destination media access control address comprising the one or more bits.

At S2030, in response to a first reset event, the update functions 1220 causes the one or more bits held in the storage 1210 to be updated to new values.

At S2040, the address resolution function 1240 provides a second destination media access control address for including in headers of further frames for dispatch over the network to the first destination, the second destination media access control address comprising the new values for the one or more bits.

Figure 21:
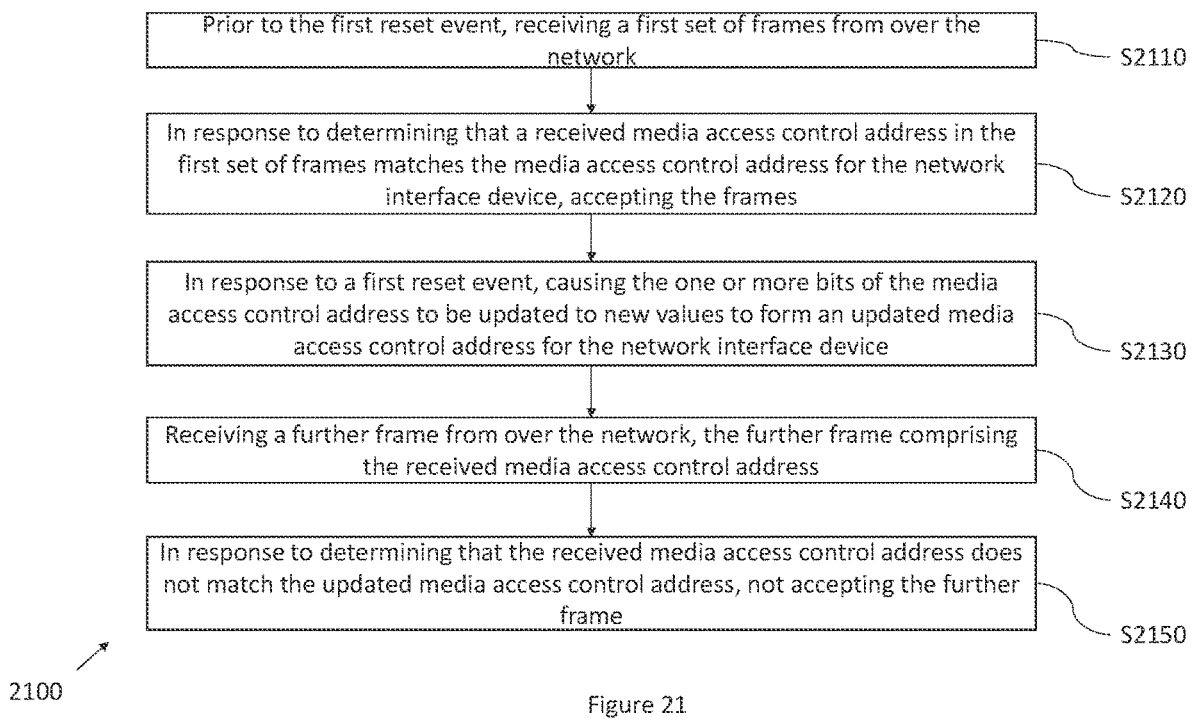
FIG. 21 illustrates a method according to further embodiments of the second invention.

Reference is made to FIG. 21, which illustrates a method 2100 according to embodiments of the second invention.

At S2110, the network interface device 403a receives a first set of frames.

At S2120, in response to determining that a received media access control address in the first set of frames matches the media access control address for the network interface device 403a, the network interface device 403a accepts the first set of frames.

At S2130, in response to a first reset event, the update function 1220 and address resolution function 1240 update the one or more bits of the media access control address to new values to form an updated media access control address for the network interface device 403a.

At S2140, a further frame is received at the network interface device 403a from over the network 401, the further frame comprising the received media access control address.

At S2150, in response to determining that the received media access control address does not match the updated media access control address, the network interface device 403a does not accept the further frame. In this case, the network interface device 403a discards the further frame.

It will be appreciated that the above embodiments have been described by way of example only. While particular embodiments have been described, other applications and variants of the disclosed techniques may become apparent to a person skilled in the art once given the disclosure herein.

The invention claimed is:

1. A data processing apparatus configured to support transmission of frames over a network, wherein the data processing apparatus comprises processing circuitry configured to perform:
   an address resolution function configured to implement a mapping function for mapping physical position identifiers or logical identifiers of data processing devices accessible on the network to media access control addresses of network interface devices of the data processing devices;
   an application configured to provide to the address resolution function, a first of the physical position identifiers or logical identifiers corresponding to a destination data processing device to which a first of the frames is to be provided over the network; and
   a protocol processing entity configured to, in response to receipt of data for the first of the frames for dispatch over the network to the destination data processing device:
      provide at least part of a link layer header for the first of the frames, the at least part of the link layer header comprising a destination media access control address determined by the address resolution function applying the mapping function to the first of the physical position identifiers or logical identifiers,
   wherein one or more bits of the destination media access control address indicate a number of times a reset event has occurred.

2. The data processing apparatus of claim 1, wherein the address resolution function is configured to determine the destination media access control address by also applying the mapping function to an identifier of a first network interface device that distinguishes the first network interface device from other network interface devices belonging to the destination data processing device.

3. The data processing apparatus of claim 1, wherein the protocol processing entity is a network protocol stack configured to perform protocol processing for the data at layers higher than a link layer.

4. The data processing apparatus of claim 1, wherein the application is configured to provide the data to the protocol processing entity.

5. The data processing apparatus of claim 4, wherein the application is configured to provide to the protocol processing entity, the first of the physical position identifiers or logical identifiers, wherein the protocol processing entity is configured to request the destination media access control address from the address resolution function based on the first of the physical position identifiers or logical identifiers.

6. The data processing apparatus of claim 1, wherein the address resolution function is configured to, following determining of the destination media access control address, cache the destination media access control address for subsequent look up for sending a second of the frames to the destination data processing device.

7. The data processing apparatus of claim 1, wherein the processing circuitry is configured to:
write at least part of the first of the frames to a network interface device for transmission over the network, wherein the at least part of the first of the frames comprises the at least part of the link layer header and a payload.

8. The data processing apparatus of claim 1, wherein the data processing apparatus comprises a network interface device comprising part of the processing circuitry, wherein the part of the processing circuitry is configured to support the protocol processing entity.

9. The data processing apparatus of claim 8, wherein the processing circuitry comprises a second part of the processing circuitry configured to:
support the address resolution function and the application; and
provide the destination media access control address to the network interface device for storage as connection state associated with a connection according to which the first of the frames is sent.

10. The data processing apparatus of claim 8, further comprising one or more processors configured to execute application instructions to write the data to the network interface device.

11. The data processing apparatus of claim 1, wherein the data processing apparatus further comprises a host device comprising the processing circuitry, wherein the processing circuitry is configured to write at least part of the first of the frames to a transmitting data processing device for transmission over the network via a network interface device of the transmitting data processing device, wherein the at least part of the first of the frames comprises the at least part of the link layer header and a payload of the first of the frames.

12. The data processing apparatus of claim 1, wherein the first of the physical position identifiers or logical identifiers comprises an internet protocol address.

13. The data processing apparatus of claim 12, wherein the processing circuitry is configured to derive the internet protocol address from a first logical identifier of the destination data processing device provided by the application.

14. The data processing apparatus of claim 1, wherein the application is configured to provide to the address resolution function, the physical position identifiers or logical identifiers of the data processing devices, wherein the address resolution function is configured to populate a memory structure with the media access control addresses in a storage that is accessible to the protocol processing entity.

15. The data processing apparatus of claim 14, wherein the memory structure is an address resolution protocol table.

16. The data processing apparatus of claim 1, wherein the data processing apparatus further comprises a register configured to store the one or more bits for inclusion in each of the media access control addresses, wherein the processing circuitry is configured to update the one or more bits in response to an indication of a first reset event.

17. The data processing apparatus of claim 1, wherein the first of the physical position identifiers or logical identifiers is a first physical position identifier, wherein the first physical position identifier comprises either or both of: a rack number, and a machine number.

18. The data processing apparatus of claim 1, wherein the processing circuitry comprises at least one processor configured to execute computer readable instructions to run the application.

19. A method for supporting transmission of frames over a network, wherein the method comprises:
providing, to an address resolution function, a physical position identifier or logical identifier corresponding to a destination data processing device to which a first of the frames is to be provided over the network;
determining a destination media access control address, by the address resolution function, including applying a mapping function to the physical position identifier or logical identifier; and
generating at least part of a link layer header for the first of the frames in response to receipt of data for the first of the frames for dispatch over the network to the destination data processing device, the at least part of the link layer header comprising the destination media access control address,
wherein one or more bits of the destination media access control address indicate a number of times a reset event has occurred.

20. A non-transitory computer readable medium storing computer readable instructions which, when executed by at least one processor, cause a method for supporting transmission of frames over a network to be carried out, the method comprising:
providing, to an address resolution function, a physical position identifier or logical identifier corresponding to a destination data processing device to which a first of the frames is to be provided over the network;
determining a destination media access control address, by the address resolution function, including applying a mapping function to the physical position identifier or logical identifier; and
generating at least part of a link layer header for the first of the frames in response to receipt of data for the first of the frames for dispatch over the network to the destination data processing device, the at least part of the link layer header comprising the destination media access control address,
wherein one or more bits of the destination media access control address indicate a number of times a reset event has occurred.

* * * * *